United States Patent
Vajapeyam et al.

(10) Patent No.: US 10,085,300 B2
(45) Date of Patent: Sep. 25, 2018

(54) CONNECTED MODE EXTENDED DISCONTINUOUS RECEPTION

(71) Applicant: QUALCOMM Incorporated, San Diego, CA (US)

(72) Inventors: Madhavan Srinivasan Vajapeyam, San Diego, CA (US); Hao Xu, San Diego, CA (US); Miguel Griot, La Jolla, CA (US); Peter Gaal, San Diego, CA (US); Masato Kitazoe, Hachiouji (JP); Wanshi Chen, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 15/040,702

(22) Filed: Feb. 10, 2016

(65) Prior Publication Data

US 2016/0242231 A1    Aug. 18, 2016

Related U.S. Application Data

(60) Provisional application No. 62/116,819, filed on Feb. 16, 2015.

(51) Int. Cl.
| | | |
|---|---|---|
| *H04W 76/28* | (2018.01) | |
| *H04W 24/08* | (2009.01) | |
| *H04W 4/70* | (2018.01) | |

(52) U.S. Cl.
CPC ............ *H04W 76/28* (2018.02); *H04W 4/70* (2018.02); *H04W 24/08* (2013.01); *Y02D 70/00* (2018.01);
(Continued)

(58) Field of Classification Search
CPC combination set(s) only.
See application file for complete search history.

(56) References Cited

U.S. PATENT DOCUMENTS

2011/0038277 A1* 2/2011 Hu .................. H04L 1/0026
370/252
2013/0315122 A1* 11/2013 Sirotkin ............ H04W 52/0225
370/311
(Continued)

FOREIGN PATENT DOCUMENTS

EP         2983395 A1    2/2016
WO    WO 2014071551 A1 *  5/2014    ............ H04W 68/02
(Continued)

OTHER PUBLICATIONS

3GPP, "3rd Generation Partnership Project, Technical Specification Group Services and System Aspects, Study on Machine-Type Communications (MTC) and Other Mobile Data Applications Communications Enhancements (Release 12)," 3GPP TR 23.887 V12.0.0 (Dec. 2013) Technical Report, Dec. 2013, 151 pgs., sections 5.1.2, 7, 8.1, 8.3, 8.4, 9.4, Annex A, XP_050729146A, 3rd Generation Partnership Project.
(Continued)

*Primary Examiner* — Yee Lam
(74) *Attorney, Agent, or Firm* — Holland & Hart LLP

(57) ABSTRACT

Methods, systems, and devices for wireless communication are described. Wireless devices may operate in an extended connected discontinuous reception (eDRX) mode to increase energy efficiency and extend battery life. Control signaling may be used to initiate or support the extended sleep cycles associated with eDRX operation. In some cases, a system frame number (SFN) extension may be implemented to record frame cycles and differentiate SFNs that occur in a first frame cycle from SFNs that occur in a second frame cycle. Control techniques to support eDRX operation and maintain network synchronicity and compatibility may also be employed. In some examples, a wireless system may broadcast extended or dedicated system information updates to an eDRX capable device or devices. In some cases,
(Continued)

devices may adjust the rate at which radio link monitoring (RLM) measurements are taken to timely determine radio link failures (RLFs) in conjunction with eDRX operation.

29 Claims, 18 Drawing Sheets

(52) U.S. Cl.
CPC ...... *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01)

(56) References Cited

U.S. PATENT DOCUMENTS

| | | | | |
|---|---|---|---|---|
| 2014/0036748 | A1* | 2/2014 | Mukherjee | H04W 52/0212 370/311 |
| 2014/0247742 | A1* | 9/2014 | Lee | H04W 52/0216 370/252 |
| 2015/0237577 | A1* | 8/2015 | Zhang | H04W 52/0216 370/311 |
| 2015/0282083 | A1* | 10/2015 | Jeong | H04W 52/0216 370/311 |
| 2017/0135150 | A1* | 5/2017 | Langereis | H04W 76/048 |
| 2017/0156158 | A1* | 6/2017 | Harris | H04W 52/0216 |

FOREIGN PATENT DOCUMENTS

| | | | |
|---|---|---|---|
| WO | WO-2014098663 A1 | 6/2014 | |
| WO | WO-2014161376 A1 | 10/2014 | |
| WO | WO-2014168537 A1 | 10/2014 | |
| WO | WO 2015020590 A1 * | 2/2015 | ........ H04W 52/0216 |

OTHER PUBLICATIONS

ISA/EP, International Search Report and Written Opinion of the International Searching Authority, Int'l. App. No. PCT/US2016/017510, dated Jun. 1, 2016, European Patent Office, Rijswijk, NL, 16 pgs.

Nokia Siemens Networks et al., "Evaluation on SA2 Identified Solutions for UEPCOP," 3GPP TSG-RAN WG2 Meeting #81bis, Chicago, R2-131147, Apr. 15-19, 2013, 6 pgs., XP_50699266A, 3rd Generation Partnership Project.

* cited by examiner

CONNECTED MODE EXTENDED DISCONTINUOUS RECEPTION

CROSS REFERENCES

The present Application for Patent claims priority to U.S. Provisional Patent Application No. 62/116,819 by Vajapeyam et al., entitled "Connected Mode Extended DRX," filed Feb. 16, 2015, assigned to the assignee hereof, and expressly incorporated by reference herein.

BACKGROUND

Field of Disclosure

The following relates generally to wireless communication, and more specifically to connected mode extended discontinuous reception (eDRX).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

A communication system may employ discontinuous reception (DRX) to conserve power usage in either the idle or connected mode. The communication system may use control signaling to schedule the sleep and awake cycles for DRX operation. A device may receive additional power benefits by extending the sleep cycle; however, as the length of the scheduled sleep intervals increase, the device may lose synchronicity with the communication system.

SUMMARY

Systems, methods, and apparatuses for connected mode extended discontinuous reception (eDRX) are described. Wireless devices may operate in eDRX to increase energy efficiency and extend battery life. A wireless system may utilize additional control signaling and techniques to support eDRX operation and maintain network synchronicity and compatibility. For example, in some cases a system frame number (SFN) extension may be signaled to differentiate between SFNs that occur in different frame cycles. Control signaling may be sent in broadcasts or via dedicated signaling to eDRX devices. In some examples, eDRX devices may adjust scheduling for radio link monitoring (RLM) measurements to identify and respond to radio link failure (RLF) conditions in view of eDRX operation.

A method of wireless communication is described. The method may include entering a connected mode by establishing an RRC connection with a base station, determining a connected mode extended DRX configuration comprising a low power period that is longer than a full SFN cycle, deactivating at least one radio component while in the connected mode for the low power period based at least in part on the connected mode extended DRX configuration, and activating the at least one radio component after the low power period based at least in part on the connected mode extended DRX configuration.

An apparatus for wireless communication is described. The apparatus may include means for entering a connected mode by establishing an RRC connection with a base station, means for determining a connected mode extended DRX configuration comprising a low power period that is longer than a full SFN cycle, means for deactivating at least one radio component while in the connected mode for the low power period based at least in part on the connected mode extended DRX configuration, and means for activating the at least one radio component after the low power period based at least in part on the connected mode extended DRX configuration.

A further apparatus for wireless communication is described. The apparatus may include a processor, memory in electronic communication with the processor, and instructions stored in the memory and operable, when executed by the processor, to cause the apparatus to enter a connected mode by establishing an RRC connection with a base station, determine a connected mode extended DRX configuration comprising a low power period that is longer than a full SFN cycle, deactivate at least one radio component while in the connected mode for the low power period based at least in part on the connected mode extended DRX configuration, and activate the at least one radio component after the low power period based at least in part on the connected mode extended DRX configuration.

A non-transitory computer-readable medium storing code for wireless communication is described. The code may include instructions executable to enter a connected mode by establishing an RRC connection with a base station, determine a connected mode extended DRX configuration comprising a low power period that is longer than a full SFN cycle, deactivate at least one radio component while in the connected mode for the low power period based at least in part on the connected mode extended DRX configuration, and activate the at least one radio component after the low power period based at least in part on the connected mode extended DRX configuration.

Some examples of the method, apparatuses, or non-transitory computer-readable medium described herein may further include processes, features, means, or instructions for receiving an indication of a hyper SFN, wherein the hyper SFN indicates a time period equal to or greater than the full SFN cycle. Additionally or alternatively, in some examples, the indication includes a dedicated signal.

In some examples of the method, apparatuses, or non-transitory computer-readable medium described herein, the indication includes a broadcast signal. Additionally or alternatively, some examples may include processes, features, means, or instructions for initiating an extended DRX inactivity timer, and determining that the extended DRX inactivity timer has expired, and deactivating the at least one radio component may be based at least in part on the expiration of the extended DRX timer.

In some examples of the method, apparatuses, or non-transitory computer-readable medium described herein, the extended DRX inactivity timer is initiated simultaneously with a default DRX inactivity timer and a period of the extended DRX inactivity timer is longer than a period of the default DRX inactivity timer. Additionally or alternatively, some examples may include processes, features, means, or instructions for determining that a default DRX timer has expired, and the extended DRX inactivity timer may be initiated based at least in part on the determination that the default DRX timer has expired.

Some examples of the method, apparatuses, or non-transitory computer-readable medium described herein may further include processes, features, means, or instructions for communicating using the RRC connection based at least in part on activating the at least one radio component. Additionally or alternatively, in some examples the full SFN cycle comprises a period of 1024 frames, where each frame comprises a 10 ms period.

Some examples of the method, apparatuses, or non-transitory computer-readable medium described herein may further include processes, features, means, or instructions for receiving an indication that system information has changed. Additionally or alternatively, in some examples, the indication is associated with a group of UEs configured for extended DRX.

Some examples of the method, apparatuses, or non-transitory computer-readable medium described herein may further include processes, features, means, or instructions for transmitting a scheduling request (SR) message or a random access channel (RACH) message subsequent to activating the at least one radio component, where the indication may be received based at least in part on the SR message or the RACH message. Additionally or alternatively, in some examples, the indication includes a field in a machine type communication (MTC) specific system information block (SIB).

In some examples of the method, apparatuses, or non-transitory computer-readable medium described herein, the indication comprises a field in SIB1. Additionally or alternatively, in some examples, the extended DRX configuration is associated with a system information modification period.

Some examples of the method, apparatuses, or non-transitory computer-readable medium described herein may further include processes, features, means, or instructions for determining a radio link monitoring (RLM) evaluation period associated with the extended DRX configuration. Additionally or alternatively, some examples may include processes, features, means, or instructions for performing a number of RLM measurements during an on duration associated with the extended DRX configuration based at least in part on the RLM evaluation period.

Some examples of the method, apparatuses, or non-transitory computer-readable medium described herein may further include processes, features, means, or instructions for determining that an RLM measurement value is less than a threshold, and performing an additional RLM measurement based at least in part on the determination. Additionally or alternatively, some examples may include processes, features, means, or instructions for identifying an out-of-sync condition based at least in part on the RLM measurements, and performing a second number of RLM measurements associated with a next RLM evaluation period subsequent to identifying the out-of-sync condition.

Some examples of the method, apparatuses, or non-transitory computer-readable medium described herein may further include processes, features, means, or instructions for transmitting an extended DRX message that includes an extended DRX capability, an extended DRX preference, or both, and the extended DRX configuration may be based at least in part on the extended DRX message. Additionally or alternatively, in some examples, the extended DRX configuration comprises an on duration based at least in part on a medium access control (MAC) rescheduling period.

Some examples of the method, apparatuses, or non-transitory computer-readable medium described herein may further include processes, features, means, or instructions for transmitting a negative acknowledgement (NACK) for a hybrid automatic repeat request (HARQ) process, initiating a retransmission timer, determining that the retransmission timer has expired prior to receiving a retransmission associated with the HARQ process, and transmitting a retransmission request based at least in part on the determination. Additionally or alternatively, some examples may include processes, features, means, or instructions for determining that MO data is available for transmission during the low power period, refraining from transmitting an SR for a remaining portion of the low power period subsequent to the determination, and transmitting an SR for the MO data after activating the at least one radio component.

Some examples of the method, apparatuses, or non-transitory computer-readable medium described herein may further include processes, features, means, or instructions for identifying an SR reporting configuration based at least in part on the extended DRX configuration.

A further method of wireless communication is described. The method may include establishing an RRC connection with a wireless device, configuring the wireless device for connected mode extended DRX that includes a low power period that is longer than a full SFN cycle and an on duration, maintaining the RRC connection with the device during the low power period, and communicating with the wireless device after the low power period using the RRC connection during the on duration.

A further apparatus for wireless communication is described. The apparatus may include means for establishing an RRC connection with a wireless device, means for configuring the wireless device for connected mode extended DRX that includes a low power period that is longer than a full SFN cycle and an on duration, means for maintaining the RRC connection with the device during the low power period, and means for communicating with the wireless device after the low power period using the RRC connection during the on duration.

A further apparatus for wireless communication is described. The apparatus may include a processor, memory in electronic communication with the processor, and instructions stored in the memory and operable, when executed by the processor, to cause the apparatus to establish an RRC connection with a wireless device, configure the wireless device for connected mode extended DRX that includes a low power period that is longer than a full SFN cycle and an on duration, maintain the RRC connection with the device during the low power period, and communicate with the wireless device after the low power period using the RRC connection during the on duration.

A non-transitory computer-readable medium storing code for wireless communication is described. The code may include instructions executable to establish an RRC connection with a wireless device, configure the wireless device for connected mode extended DRX that includes a low power period that is longer than a full SFN cycle and an on duration, maintain the RRC connection with the device during the low power period, and communicate with the wireless device after the low power period using the RRC connection during the on duration.

Some examples of the method, apparatuses, or non-transitory computer-readable medium described herein may further include processes, features, means, or instructions for transmitting an indication of a hyper SFN, where the hyper SFN indicates a time period equal to or greater than the full SFN cycle. Additionally or alternatively, in some examples, the indication comprises a dedicated signal.

In some examples of the method, apparatuses, or non-transitory computer-readable medium described herein, the indication comprises a broadcast signal. Additionally or alternatively, in some examples, the full SFN cycle includes a period of 1024 frames, and each frame may have a 10 ms period.

Some examples of the method, apparatuses, or non-transitory computer-readable medium described herein may further include processes, features, means, or instructions for transmitting an indication that system information has changed. Additionally or alternatively, in some examples, the indication is associated with a group of UEs configured for extended DRX.

Some examples of the method, apparatuses, or non-transitory computer-readable medium described herein may further include processes, features, means, or instructions for receiving an SR message or a RACH message during the on duration, and the indication may be transmitted based at least in part on the SR message or the RACH message. Additionally or alternatively, in some examples, the indication includes a field in an MTC-specific SIB.

In some examples of the method, apparatuses, or non-transitory computer-readable medium described herein, the indication comprises a field in SIB1. Additionally or alternatively, some examples may include processes, features, means, or instructions for transmitting an indication that the wireless device is configured for the connected mode extended DRX configuration to a core network element.

Some examples of the method, apparatuses, or non-transitory computer-readable medium described herein may further include processes, features, means, or instructions for transmitting an exit indication for the connected mode extended DRX configuration to the core network element. Additionally or alternatively, some examples may include processes, features, means, or instructions for receiving an exit command for the connected mode extended DRX configuration from the core network element.

Some examples of the method, apparatuses, or non-transitory computer-readable medium described herein may further include processes, features, means, or instructions for extending a SIB modification period based at least in part on the eDRX. Additionally or alternatively, in some examples, the extended DRX configuration is associated with a system information modification period.

Some examples of the method, apparatuses, or non-transitory computer-readable medium described herein may further include processes, features, means, or instructions for determining an RLM evaluation period associated with the extended DRX configuration. Additionally or alternatively, some examples may include processes, features, means, or instructions for receiving an extended DRX message that may include an extended DRX capability, an extended DRX preference, or both, where the extended DRX configuration may be based at least in part on the extended DRX message.

Some examples of the method, apparatuses, or non-transitory computer-readable medium described herein may further include processes, features, means, or instructions for notifying a core network element of the extended DRX capability, the extended DRX preference, or both. Additionally or alternatively, in some examples, the extended DRX configuration includes an on duration based at least in part on a MAC rescheduling period.

Some examples of the method, apparatuses, or non-transitory computer-readable medium described herein may further include processes, features, means, or instructions for receiving a retransmission request associated with a HARQ retransmission timer of a wireless device, and sending a retransmission for a HARQ process based at least in part on the retransmission request. Additionally or alternatively, some examples may include processes, features, means, or instructions for establishing an SR reporting configuration based at least in part on the extended DRX configuration.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A wireless system may use a discontinuous reception (DRX) mode, in which a device monitors downlink channels at predetermined intervals to conserve energy. Devices within a system may operate in idle or connected DRX modes. Some devices may employ an connected mode extended DRX (eDRX) operation, during which the device may sleep for a period, while in a connected mode, that extends longer than a frame cycle. In some cases, a wireless system may use additional signaling and control parameters to configure and support the eDRX mode. The wireless system may also employ certain control techniques to support the eDRX mode and maintain synchronicity within the system.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
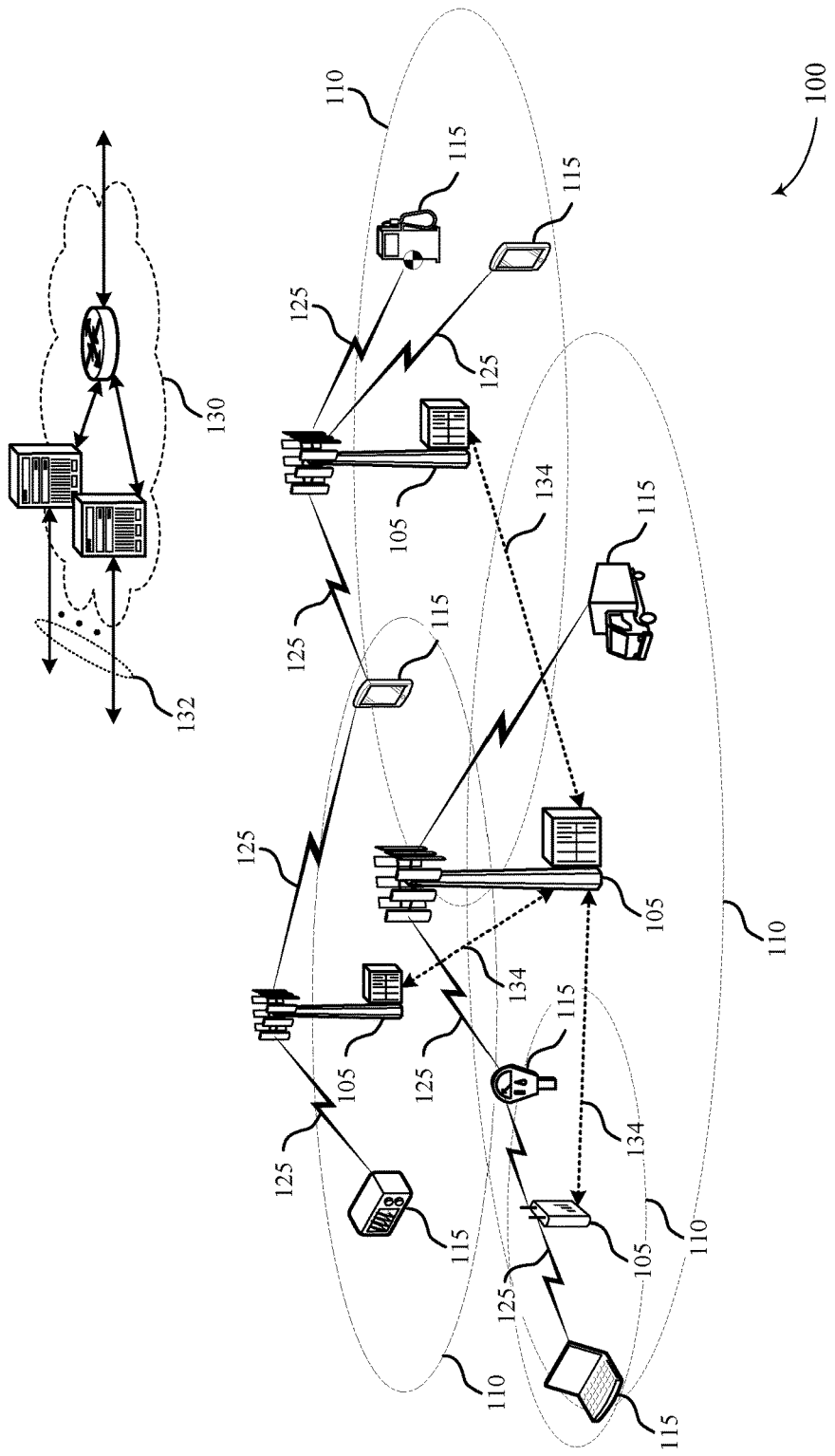
FIG. 1 illustrates an example of a wireless communications system that supports connected mode extended DRX in accordance with various aspects of the present disclosure.

FIG. 1 illustrates an example of a wireless communications system 100 that supports connected mode extended discontinuous reception (DRX) in accordance with various aspects of the present disclosure. The wireless communications system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like. Some of the UEs 115 may support DRX, C-DRX, or eDRX operation; some UEs 115 support all three (i.e., DRX, C-DRX, and eDRX).

A UE 115 operating in a DRX mode may operate according to a DRX cycle, which may include both DRX ON and DRX OFF durations. A DRX ON duration may be defined as a period of time during which all or most of the radio components utilized by a UE 115 for receiving are activated (e.g., powered on). In some cases, a DRX ON duration, or DRX ON cycle, is referred to as a period or time during which a UE 115 is "awake." So, in some cases, a UE 115 that transitions from a DRX OFF duration to a DRX ON duration is said to "wake up." Similarly, a DRX OFF duration may be defined as a period of time during which all or most of the radio components utilized by a UE 115 for receiving are deactivated (e.g., powered off). In some cases, a DRX OFF duration, or DRX OFF cycle is referred to as a period or time during which a UE 115 is "asleep." Accordingly, in some cases, a UE 115 that transitions from a DRX ON duration to a DRX OFF duration is said to "go to sleep." A DRX ON duration and a DRX OFF duration may make up a DRX cycle. In a connected DRX mode (or connected mode DRX), a UE 115 may maintain an RRC connection with a base station 105 (e.g., operate in RRC CONNECTED mode) while powering off certain components of the UE 115 for some predetermined interval.

In some examples, eDRX may be used to provide an extended C-DRX cycle. Thus, eDRX may offer additional battery savings over C-DRX mode. Moreover, maintaining an RRC connection, rather than transitioning to an idle mode, may limit the number of idle-to-connected transitions of a UE 115 and may also offer battery savings over idle DRX mode operation.

Some types of wireless devices may provide for automated communication. Automated wireless devices may include those implementing Machine-to-Machine (M2M) communication or Machine Type Communication (MTC). M2M or machine type communication (MTC) may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. Additionally or alternatively, MTC device may employ eDRX.

A base station 105 may be connected by an S1 interface to the core network 130. The core network may be an evolved packet core (EPC), which may include a mobility management entity (MME), a serving gateway (S-GW), and a PDN gateway (P-GW). The MME may be the control node that processes the signaling between the UE 115 and the evolved packet core (EPC). All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP Multimedia System (IMS), and a Packet-Switched (PS) Streaming Service (PSS).

An MME may be a key network node for exchanging control information with UEs 115. For example, the MME may be involved in the network connection activation/deactivation process and may also be involved in authenticating a user in coordination with an home subscriber server (HSS). Non Access Stratum (NAS) signaling—which may be used for the establishment of communication sessions and for maintaining continuous communications with UEs 115 as they move—may be initiated or directed at the MME. The MME may also allocate a temporary identity to a UE 115. For example, the MME may allocate a globally unique temporary identity (GUTI) to a UE 115 that includes identification information for the MME as well as a temporary identity for the UE 115. A GUTI may minimize the frequency with which a persistent identity, e.g., an international mobile subscriber identity (IMSI), is transmitted within the network. The MME may also check whether a UE 115 is authorized to camp on a service provider's Public Land Mobile Network (PLMN), and may manage security keys for non-access stratum (NAS) signaling such as attachment procedures for UEs 115 and handles the security key management. In some examples, a base station 105 may signal DRX capability or status, or both, to an MME.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

After completing initial cell synchronization, a UE 115 may decode the master information block (MIB), system information block (SIB)1 and SIB2 prior to accessing the network. The MIB may be transmitted on physical broadcast channel (PBCH) and may utilize the first 4 orthogonal frequency division multiple access (OFDMA) symbols of the second slot of the first subframe of each radio frame. The MIB may carry a few important pieces of information for UE initial access, including: DL channel bandwidth in term of RBs, physical HARQ indicator channel (PHICH) configuration (duration and resource assignment), and system frame number (SFN). A new MIB may be broadcast every fourth radio frame (SFN mod 4=0) at and rebroadcast every frame (10 ms).

After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 may include access information, including cell identity information, and it may indicate whether a UE is allowed to camp on a cell 105. SIB1 may also include cell selection information (or cell selection parameters). Additionally, SIB1 may include scheduling information for other SIBs. SIB2 may be scheduled dynamically according to information in SIB1, and includes access information and parameters related to common and shared channels. In some examples, system 100 may utilize a special SIB, which may be referred to as an MTC-specific SIB, which may be broadcast by base stations 105 and decoded by some UEs 115, including MTC devices within system 100. The MTC-specific SIB may include certain information that is also conveyed in other SIBs, but may exclude certain information sent in such SIBs. The MTC-specific SIB may thus include information tailored for MTC operation, include eDRX, within system 100.

System 100 may use timing that includes radio frames that are partitioned into transmission time intervals (TTIs), which may be 1 ms subframes. Each radio frame may be consecutively assigned an SFN within an SFN range (e.g., SFN 0 to SFN 1023). After assigning the last frame number (e.g., SFN 1023) to a radio frame, the communication system may assign SFN 0 again to the next radio frame. A UE 115 may receive an SFN indicator that informs the UE 115 about the SFN assigned to the present radio frame. In some cases, a radio frame may have a duration of 10 ms and the full set of SFNs may last 10.24 seconds. During DRX operation, a UE 115 may monitor the PDCCH at predetermined intervals, instead of continuously (e.g., every radio frame, or when a delay threshold, time threshold, or response threshold is met or exceeded). As mentioned, the DRX mode may be used either in idle-mode operation or connected mode operation (connected DRX (C-DRX) mode). These predetermined intervals may be based on a C-DRX cycle, which, in some cases, may be limited to 2.56 seconds. A C-DRX capable UE 115 may determine the length of a C-DRX cycle based on an SFN because the C-DRX cycle may be less than a full SFN cycle.

After the UE 115 decodes SIB2, it may transmit a random access channel (RACH) preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an UL resource grant, a timing advance and a temporary cell radio network temporary identity (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In some cases, a UE 115 may monitor a wireless link 125 continuously for an indication that the UE 115 may receive data. In other cases (e.g., to conserve power and extend battery life) a UE 115 may be configured with a DRX cycle. As mentioned, a DRX cycle consists of an "ON duration" (e.g., DRX ON) when the UE 115 may monitor for control information (e.g., on physical downlink control channel (PDCCH)) and a "low power period" or "OFF duration" (e.g., DRX OFF) when the UE 115 may power down radio components. In some cases, a UE 115 may be configured with a short DRX cycle and a long DRX cycle. In some cases, and as discussed further below, a UE 115 may enter a long DRX cycle if the UE 115 inactive for one or more short DRX cycles. The transition between the short DRX cycle, the long DRX cycle and continuous reception may be controlled by an internal timer or by messaging from a base station 105.

A UE 115 may receive scheduling messages on PDCCH during the ON duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle. In some cases, however, (e.g., for MTC devices) a long DRX cycle may be insufficient to cover a desired sleep period. Thus, a UE 115 may also be configured with an eDRX cycle as described herein, which may, as alluded to above, reduce the number of transitions from idle mode to connected mode and thus reduce the number of access procedures the device may perform.

Additional signaling may be used with eDRX operation to maintain compatibility and synchronicity with the system 100 because an eDRX cycle may be longer than the frame cycle duration. A frame cycle may be the duration of time used to assign the full set of SFNs (e.g., SFN 0-SFN 1023). So, for instance, in the absence of some distinction between successive sets of SFNs, an eDRX cycle that extends longer than a frame cycle may cause devices within a system to lose synchronicity. For example, if the system frame numbering restarts while a device is in a low power state (e.g., DRX OFF)—that is, if the SFNs 0-1023 have been used—the device may be unable to determine or identify a correct SFN for a particular operation. In other words, without some means of distinguishing between, e.g., SFN0 of successive frame cycles, eDRX may introduce undesirable issues to system 100.

Accordingly, one set of 1024 SFNs may be distinguished from a subsequent set of 1024 SFNs by defining hyper SFNs. System 100 may thus assign a hyper-SFN to each frame cycle to distinguish one SFN from an SFN sharing the same value but occurring in a subsequent frame cycle. As described below, this may allow a UE 115 to associate an SFN with a hyper-SFN and thereby differentiate between two SFNs of the same value (e.g., hyper-SFN 0:SFN 0; hyper-SFN 1:SFN0). In some cases, a hyper-SFN may be signaled in a SIB (e.g., SIB1). Additionally or alternatively, a dedicated SIB, such as an MTC-specific SIB, may be directed utilized by eDRX-capable devices. System 100 may also send additional eDRX parameters to support eDRX operation. For example, one eDRX parameter may indicate the eDRX cycle length. Other parameters may include an eDRX offset to indicate an SFN and subframe offset, and an eDRX timer may be used to trigger when a UE 115 should the eDRX state. System 100 may also send an eDRX media access MAC control element (CE) to command a UE 115 to enter eDRX mode. In some cases, a UE 115 may be configured for eDRX operation, C-DRX operation, or a combination of eDRX and C-DRX operation, as described herein.

In addition to signaling certain information to eDRX-capable UEs 115, system 100, via base stations 105, may configure such UEs 115 for eDRX operation. For instance, a UE 115 may indicate a DRX capability to the core network 130—e.g., a UE 115 may indicate whether it is DRX capable, C-DRX capable, eDRX capable, or the like. A UE 115 may, in some examples, request to be configured for eDRX. In some cases, this request may be included in the power preference indication procedure for a UE 115. For example, a UE 115 may extend the power preference indicator to include an eDRX indicator that indicates the eDRX capability to the core network 130, or an entity within the core network 130 (e.g., an MME). A UE 115 operating in the eDRX mode may notify the system 100 that it is operating in an eDRX state—e.g., with signaling to the MME via a base station 105. In some examples, a base station 105 may indicate to an entity within the core network 130, such as mobility management entity (MME), when a UE 115 enters or leaves an eDRX state. The MME may request that a device leave the eDRX state and a base station 105 may de-configure the UE 115 or send a MAC CE to command the UE 115 to exit an eDRX state.

System 100 may use various control techniques to support eDRX operation. For instance, the system information for system 100 may periodically change. The changes may be broadcast during a modification period to alert UEs 115 in the system 100 of the upcoming system information changes. In some cases, the modification period may last up to 10.24 seconds. Base stations 105 may broadcast the changes in a paging message, or a UE 115 may determine the changes after checking a ValueTag in SIB1.

Because an eDRX cycle may extend for a period greater than 10.24 seconds, an eDRX capable UE 115 may be susceptible to missing a system information update. In some cases, the system 100 may extend the modification period to accommodate an eDRX cycle. In other cases, a base station 105 may send a dedicated eDRX system update indicator during an eDRX ON cycle. The dedicated eDRX indicator may be sent to individual UEs 115 or to groups of eDRX capable UEs 115 that have overlapping eDRX ON cycles.

In some examples, a UE 115 may wake up to send mobile originated data outside of the scheduled eDRX ON cycle. In such cases, the UE 115 may proactively check the ValueTag of SIB 1 to collect the system information. The UE 115 may also send a scheduling request (SR) or use a physical random access channel (PRACH) procedure to request the system update indicator. In other examples, an eDRX capable UE 115 may monitor an MTC-specific SIB that accommodates the longer sleep duration associated with eDRX operation.

In some examples, HARQ may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information.

A UE 115 in eDRX mode may experience delayed recovery in the event of an ACK/NACK error or failure to receive a downlink (DL) grant. In some examples, a UE 115 may enter an extended sleep mode (e.g., DRX OFF of an eDRX cycle) before the UE 115 is rescheduled for a transmission. In some cases, longer eDRX ON timers may be used to allow a base station 105 MAC to re-schedule the device before it enters the sleep mode. In other cases, a UE 115 may report a NACK for a HARQ process and start a timer. If the timer expires before a HARQ retransmission is scheduled, the UE 115 may request the retransmission. This may trigger a MAC CE transmission including the HARQ retransmission. In some cases, a UE 115 may send a scheduling request to a base station 105 in order to transmit mobile originated (MO) data. Scheduling requests may have a periodicity of 1 ms to 80 ms and a device may immediately exit a C-DRX state. An eDRX capable UE 115 may delay the SR until the subsequent DRX ON period. In some cases, an occurrence of SR in eDRX OFF may be masked to prevent a UE 115 from waking up to send a SR until eDRX ON. In some examples, an extended SR may be utilized that is aligned with eDRX cycles.

In some cases, a UE 115 may determine that a radio link has failed and initiate a radio link failure (RLF) procedure. For example, an RLF procedure may be triggered upon an RLC indication that a maximum number of retransmissions has been reached, upon receiving a maximum number of out-of-sync indications, or upon radio failure during a RACH procedure. In some cases (e.g., after reaching the limit for out-of-sync indications), a UE 115 may initiate a timer and wait to determine whether a threshold number of in-sync indications are received. If the number of in-sync indications exceeds the threshold prior to expiration of the timer, the UE 115 may abort the RLF procedure. Otherwise, the UE 115 may perform a RACH procedure, as described above, to regain access to network. The RACH procedure may include transmitting an RRC connection re-establishment request including the C-RNTI, the cell identification (ID), security verification information, and a cause for re-establishment. The base station 105 receiving the request may respond with either an RRC connection re-establishment message or an RRC connection re-establishment rejection. The RRC connection re-establishment message may contain parameters for establishing a signaling radio bearer (SRB) for the UE 115 as well as information for generating a security key. Once the UE 115 receives the RRC connection establishment message it may implement the new SRB configuration and transmit an RRC connection re-establishment complete message to the base station 105.

System 100 may use radio link monitoring (RLM) measurements to determine whether a UE 115 should perform cell reselection after experiencing RLF. An evaluation period, $T_{eval}$, in which 5 RLM measurements may be taken, may be used to determine whether channel conditions are acceptable. A UE 115 in C-DRX mode may take a measurement once every C-DRX cycle, for example. In some cases, $T_{eval}$ for DRX operation may be determined using the equation: $T_{eval}=5*DRX_{cycle}$. A C-DRX cycle may extend up to 2.56 seconds and the evaluation period may be 12.8 seconds. An eDRX cycle may extend significantly longer than a C-DRX cycle (e.g., 10 minutes) and $T_{eval}$ may become comparatively long (e.g., $T_{eval}=5*DRX_{cycle}=50$ minutes). A long $T_{eval}$ may delay the declaration of RLF, which system 100 may be expecting within 10 minutes. In some cases, an eDRX capable UE 115 may take additional samples during an eDRX cycle to shorten the evaluation period. For example, the UE 115 may take N RLM measurements spaced by interval T during eDRX ON (e.g., N=5 and T=100 ms). If the measurements detect that the UE 115 is out-of-sync, the UE 115 may continue to perform RLM for the next $T_{eval}$. In some examples, the UE 115 may perform additional measurements after receiving a poor measurement and take measurements at an increased rate.

A UE 115 may thus use an eDRX mode as described herein to increase energy efficiency and extend battery life. Additional control signaling may be used to support the extended sleep cycles associated with eDRX operation. In some cases, an SFN extension may be implemented to record frame cycles and differentiate SFNs that occur in a first frame cycle from SFNs that occur in a second frame cycle. Moreover, system 100 may utilize additional control techniques to support eDRX operation and maintain network synchronicity and compatibility.

Figure 2:
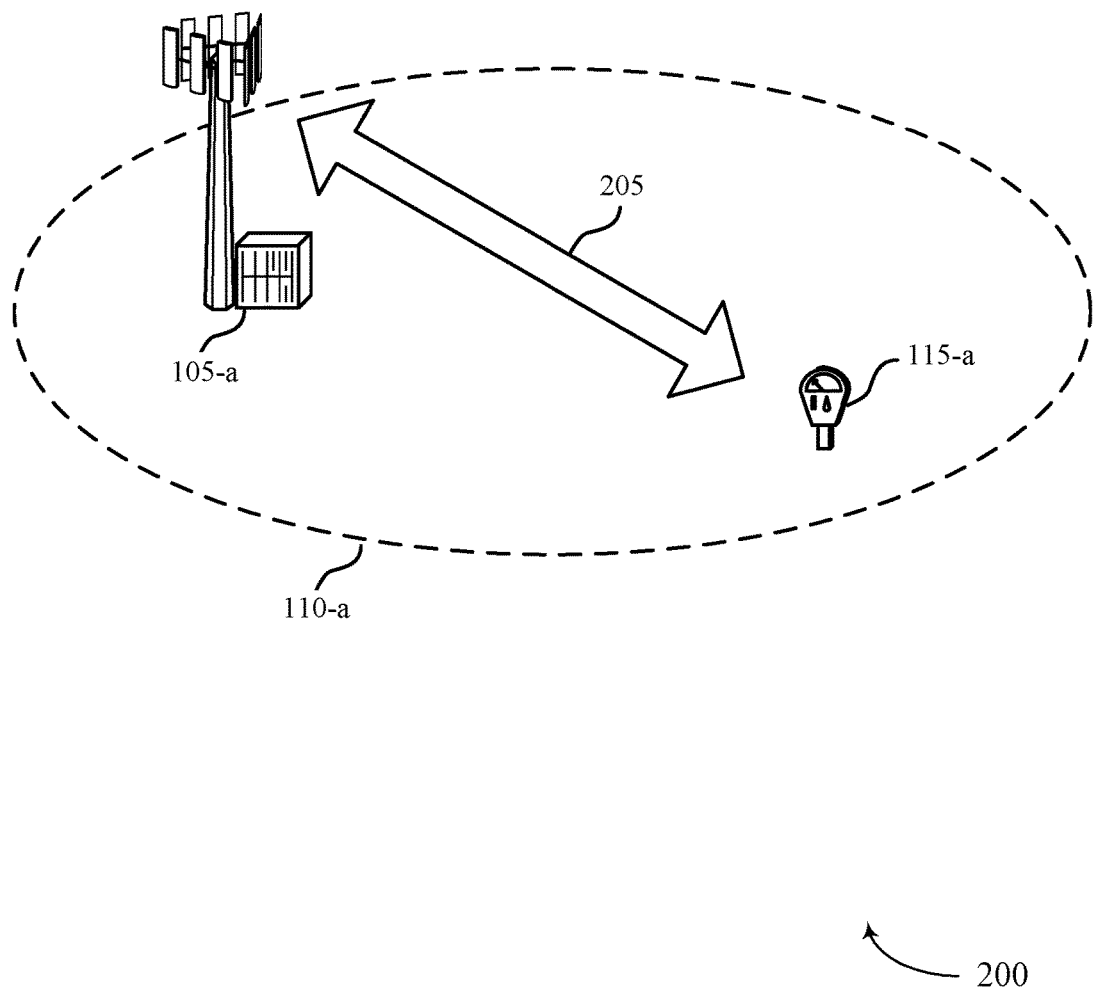
FIG. 2 illustrates an example of a wireless communications system that supports connected mode extended DRX in accordance with various aspects of the present disclosure.

FIG. 2 illustrates an example of a wireless communication system 200 for connected mode extended DRX in accordance with various aspects of the present disclosure. Wireless communications system 200 may include UE 115-a and base station 105-a, which may be examples of a UE 115 or a base station 105 described above with reference to FIG. 1.

In some cases, UE 115-a may be an MTC device, or another device designed to operate for long periods on a battery charge. Base station 105-a and UE 115-a may communicate with one another via communications link 205 when UE 115-a is within coverage area 110-a, as described above with reference to FIG. 1.

UE 115-a may use DRX mode to schedule sleep intervals and conserve energy. In some cases, UE 115-a may use an eDRX mode that implements extended sleep intervals to provide additional energy savings. Wireless communication system 200 may employ configuration techniques to configure and monitor eDRX capable devices for eDRX operation. An eDRX capable device such as UE 115-a may support extended sleep intervals; however, as the scheduled sleep intervals increase (e.g., greater than 10.24 sec) additional control signaling and parameters may be utilized to support the eDRX cycles. Additional control techniques may additionally be implemented to support eDRX operation and maintain compatibility with the network.

In some examples, UE 115-a may experience long durations in between successive communications with base station 105-a (e.g., communications may occur in 30-minute intervals, or may be of longer or shorter duration). UE 115-a may also be an eDRX capable device and may conserve energy by utilizing extended sleep intervals. In some cases, an extended sleep interval may extend beyond a frame cycle and may thus be greater than 10.24 seconds. As described above, frame cycle may be the interval in which a network assigns all of the SFNs in the range SFN 0 to SFN K to a radio frame; where K may equal 512, 1024, 2048, etc. In some cases, base station 105-a may send a configuration message to UE 115-a configuring UE 115-a to operate in eDRX mode. In other cases, UE 115-a may request that wireless network 200 configure UE 115-a for eDRX operation. For example, UE 115-a may extend the power preference indicator to include an eDRX indicator or value. Base station 105-a may additionally inform the wireless network 200 (e.g., indicate to the MME) when UE 115-a enters or exits eDRX operation. In some cases, the MME may request that eDRX be disabled in which case base station 105-a may de-configure UE 115-a for eDRX operation.

System 200 may use additional control signaling and parameters to configure and support eDRX operation. In some examples, the control signaling may include an SFN extension to record frame cycles and distinguish one frame cycle from another. The SFN extension may be used to support sleep cycles that extend longer than one frame cycle. By distinguishing one frame cycle from a subsequent frame cycle, UE 115-a may distinguish two SFNs that share the same value but occur at different times. This may include the use of hyper SFNs, as described above—e.g., hyper SFN 0:SFN 7 and hyper SFN 1:SFN 7. The SFN extension may be signaled using a broadcast, such as a SIB, or using dedicated signaling. The control information may additionally include control parameters, which may include eDRX cycle, eDRX offset, or eDRX timer. These control parameters may be signaled via dedicated signaling, for example.

System 200 may use additional control techniques to support eDRX operation. For instance, base station 105-a may broadcast system information changes according to an extended modification period to accommodate the eDRX cycle of UE 115-a. In other cases, base station 105-a may send a dedicated eDRX indicator during an eDRX ON cycle informing UE 115-a, or a group of UEs 115 with overlapping eDRX ON cycles, of the system information update. In yet another case, UE 115-a may wake up to send mobile originated data outside of the scheduled eDRX ON cycle. In this case, UE 115-*a* may check the ValueTag of SIB 1 to identify the system information or send a scheduling request (SR) to receive the indicator from base station 105-*a*.

In some cases, UE 115-*a* may take additional RLM measurements at shorter intervals to shorten the evaluation period $T_{eval}$, which may become excessively long based on the eDRX cycle. For example, UE 115 may take N RLM measurements spaced by intervals of at least Tms during eDRX ON (e.g., N=5 and T=100 ms). If an out of sync flag is raised, UE 115-*a* may continue to take RLM measurements for the next $T_{eval}$. In some examples, UE 115-*a* may take RLM measurements at an increased rate after receiving a poor measurement.

In the case of an ACK/NACK error or failed downlink grant, UE 115-*a* may use longer DRX ON timers that allow base station's 105-*a* MAC to re-schedule UE 115-*a* before UE 115-*a* enters the sleep state. In other cases, UE 115-*a* may report a NACK for a HARQ process and start a timer. If the timer expires before a HARQ retransmission is scheduled the device may request the retransmission. This may trigger a MAC CE transmission including the HARQ retransmission. The UE 115-*a* may send a scheduling request to a base station 105-*a* in order to transmit MO data. Scheduling requests may have a periodicity of 1 ms to 80 ms and the UE 115-*a* may immediately exit a DRX state. DRX-capable UE 115-*a* may delay the SR until the subsequent DRX ON. Additionally or alternatively, an occurrence of SR in DRX OFF may be masked to prevent UE 115-*a* from waking up to send a SR until DRX ON. Or, in some examples, an extended SR may be utilized that is aligned with eDRX cycles.

Figure 3:
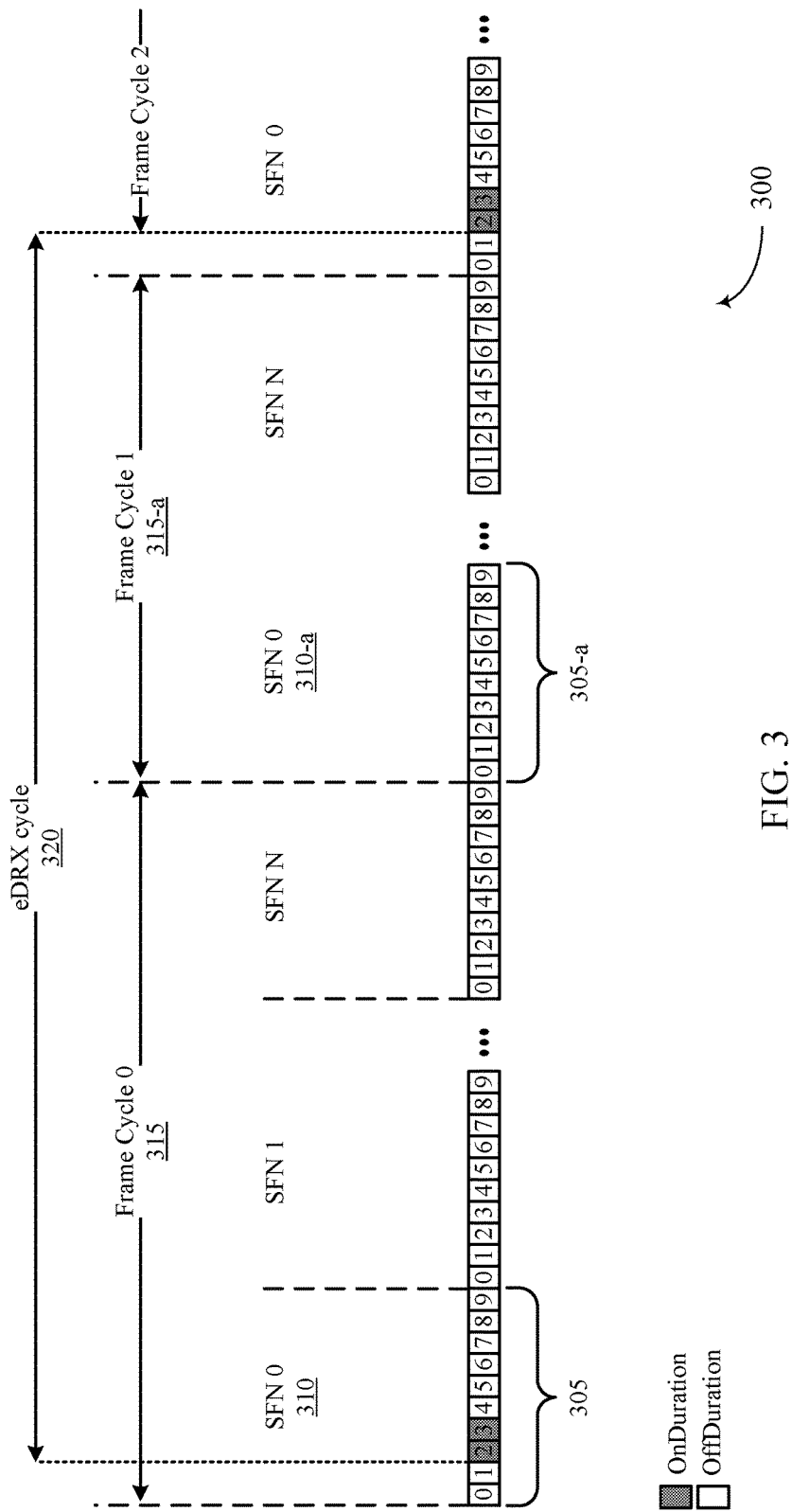
FIG. 3 illustrates an example of a timing diagram for a system that supports connected mode extended DRX in accordance with various aspects of the present disclosure.

FIG. 3 illustrates an example of eDRX timing diagram 300 the may be employed in a system that supports connected mode extended DRX in accordance with various aspects of the present disclosure. The eDRX timing diagram 300 may illustrate aspects of a transmission between a UE 115 and a base station 105, as described above with reference to FIGS. 1 and 2. The eDRX timing diagram 300 may include radio frames, such as radio frame 305 and subsequent radio frame 305-*a*. SFNs, such as SFN 0 310 and subsequent SFN 0 310-*a*, may be assigned to each radio frame in a frame cycle. A frame cycle, such as frame cycle 0 315 and frame cycle 1 315-*a*, may include system frame numbers: SFN 0 to SFN N. The frame cycles may be referred to as hyper SFNs, such that frame cycle 0 315 may be referred to as hyper SFN 0 315, frame cycle 1 315-*a* may be referred to as hyper SFN 1 315-*a*, and so on. A eDRX cycle 320 may include an ON duration and an OFF duration and may extend multiple frame cycles—i.e., multiple hyper SFNs.

A base station 105 may configure a UE 115 for eDRX operation and configure eDRX cycle 320. During configuration, an eDRX capable UE 115 may receive an extended SFN and identify the frame cycle and SFN for a current radio frame. The UE 115 may then receive eDRX parameters informing the UE 115 of the eDRX cycle, eDRX offset, ON duration, and eDRX timer. For instance, the eDRX cycle parameter may be used to inform a UE 115 the duration of an eDRX cycle, an eDRX offset may be used to signal an SFN offset and a subframe offset, and an eDRX timer may be used to trigger eDRX operation for a UE 115.

In some examples, a frame cycle may include 1024 SFNs and last 10.24 seconds. A UE 115 configured for eDRX operation may receive extended SFN and eDRX parameters. During wireless operation, the eDRX timer may expire and the UE 115 may enter eDRX mode. The UE 115 may use the extended SFN to associate the present radio frame to identify frame cycle 0 315 and SFN 0 310. The UE 115 may then use the received eDRX cycle parameter to determine the length of eDRX cycle 320. For instance, the eDRX cycle parameter may indicate that the cycle extends for multiple frame cycles (e.g., 2 frame cycles (or 2 hyper SFNs) of 20.48 seconds). In some cases, the eDRX cycle parameter may indicate a threshold, such as a delay threshold, a time threshold, a response threshold, etc., which may be used to determine the length of an eDRX mode or a low power period. For example, the eDRX mode or the low power period may last until a time threshold is met or exceeded. In some cases, a timer may start when the eDRX mode or low power period begins, and the time threshold may be in relation to the timer. The eDRX offset parameter may determine in what system frame and subframe the eDRX cycle begins (e.g., SFN offset: 0 and subframe offset: 2). The ON duration parameter may indicate the on period and the OFF duration may be determined by subtracting the ON duration from the eDRX cycle duration (e.g., ON duration: 2 subframes OFF duration: 20478 subframes).

Figure 4:
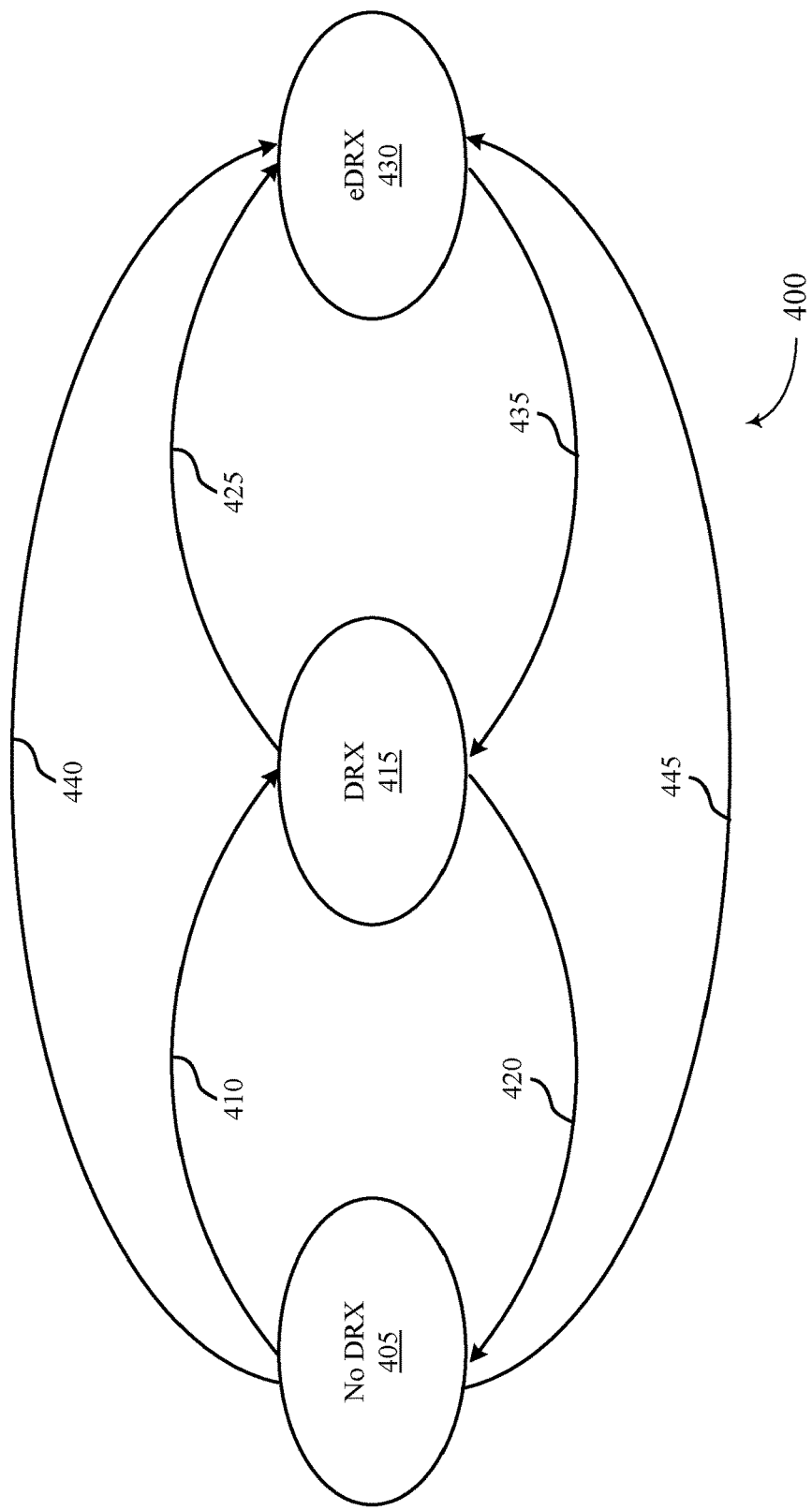
FIG. 4 illustrates an example of a state diagram for devices and systems that support connected mode extended DRX in accordance with various aspects of the present disclosure.

FIG. 4 illustrates an example of a state diagram 400 for devices and systems that support connected mode extended DRX in accordance with various aspects of the present disclosure. State diagram 400 may represent DRX states of and transitions performed by a UE 115 and base station 105 with reference to FIGS. 1-2. The transitions may happen in any order, and the order described herein may not represent an actual order of transitions experienced by a UE 115. In some examples, a UE 115 may perform one or more of the following steps during an eDRX procedure. In some cases, a UE 115 may be configured for DRX mode only, eDRX mode only, or a combination of DRX mode and eDRX mode.

At state 405, an eDRX capable device (e.g., a UE 115) may be in or enter a connected mode by establishing an RRC connection with an access point. The eDRX capable device may transmit an extended DRX message including an extended DRX capability, an extended DRX preference, or both to the network. The network may configure the wireless device for DRX and connected mode extended DRX. The extended DRX configuration may be based on the extended DRX message sent by the eDRX capable device. In some examples, the extended DRX configuration includes an ON duration based on a MAC rescheduling period. After the eDRX capable device has been configured, during each period when a device is not actively communicating with the network, the eDRX capable device may initiate a default DRX inactivity timer and, in some cases, a simultaneous extended DRX inactivity timer. In other cases, the eDRX timer may be initiated upon expiration of the DRX timer. In some cases, the period of the extended DRX inactivity timer may be longer than a period of the default DRX inactivity timer.

At step 410, the eDRX capable device may transition to a default DRX mode. In some cases, the eDRX capable device may transition after determining that the default DRX timer has expired. In other cases, the eDRX capable device may transition after receiving a DRX command.

At state 415, the eDRX capable device may be in or begin default DRX operation. In some examples, the eDRX capable device may initiate the extended DRX inactivity timer. The eDRX capable device may deactivate one or several radio components during a configured low power period (e.g., DRX OFF duration). The eDRX capable device may maintain the RRC connection with the network during the low power period. The eDRX capable device may communicate using the RRC connection upon activating the radio component. The eDRX capable device may activate the radio components during a DRX ON duration.

At step 420, the eDRX capable device may transition back into the connected mode, no DRX state 405, after receiving mobile originate (MO) data for transmission. In some cases, the eDRX capable device may receive an exit indication from a base station 105. In some cases, the exit indication is sent as a MAC CE message.

At step 425, the eDRX capable device may transition in to connected mode extended DRX. In some cases, the eDRX capable device may transition after determining that the eDRX timer has expired. In other cases, the eDRX capable device may transition after receiving an eDRX command.

At state 430, the eDRX capable device may be in or enter eDRX operation. In some examples, the eDRX capable device may be configured for an extended low power period that may extend longer than a full SFN cycle, such as based on a threshold. The eDRX capable device may receive an indication of a hyper SFN, and the hyper SFN may indicate a time period equal to or greater than the full SFN cycle—a frame cycle, as described in FIG. 3. In some examples, dedicated signaling is used for the indication. In other examples, the indication is transmitted in a broadcast signal. In some examples, the full SFN cycle includes a period of 1024 frames, and each frame includes a 10 ms period. The eDRX capable device may deactivate a radio component while in the connected mode for the extended low power period. The eDRX capable device may maintain the RRC connection with the network during the extended low power period. The eDRX capable device may communicate using the RRC connection based on activating the radio component, which may be during a DRX ON duration.

During eDRX operation, the eDRX capable device may receive an indication that system information has changed. In some examples, the indication is associated with a group of UEs 115 configured for eDRX. In some examples, the indication includes a field in an MTC-specific SIB. Additionally or alternatively, the indication may include a field in SIB1. In some cases, a network 130 or base station 105 may extend a SIB modification period based on the eDRX. The eDRX capable device may transmit an SR message or a RACH message to request the system information indicator from the network. In some examples, the extended DRX configuration is associated with a system information modification period.

During eDRX operation, the eDRX capable device may also determine an RLM evaluation period associated with the extended DRX configuration. The eDRX capable device may perform a number of RLM measurements during an ON duration associated with the extended DRX configuration based on, for example, the RLM evaluation period. The eDRX capable device may determine that an RLM measurement value is less than a threshold. The eDRX capable device may thus perform an additional RLM measurement based on the determination. The eDRX capable device may, in some examples, identify that an out-of-sync condition exists based on the RLM measurements. Additionally or alternatively, the eDRX capable device may perform a second number of RLM measurements associated with a next RLM evaluation period subsequent to identifying the out-of-sync condition.

During eDRX operation, the eDRX capable device may transmit a NACK for a HARQ process. The eDRX capable device may initiate a retransmission timer upon NACK transmission, for instance. The eDRX capable device may determine that the retransmission timer has expired prior to receiving a retransmission associated with the HARQ process, and it may transmit a retransmission request based on the determination. The eDRX capable device may receive a retransmission request associated with a HARQ retransmission timer of a wireless device. The eDRX capable device may send a retransmission for a HARQ process based on the retransmission request.

At step 435, the eDRX capable device may transition back into default DRX mode after receiving a DRX command. In some cases, the DRX command is a MAC CE command received from the access point.

At step 440, the eDRX capable device may bypass the default DRX mode and transition directly in to connected mode extended DRX. In some cases, the eDRX capable device may transition after determining that the eDRX timer has expired. In other cases, the eDRX capable device may transition after receiving an eDRX command.

At step 445, the eDRX capable device may transition back into the connected mode after identifying mobile originate (MO) data for transmission. During eDRX operation, the eDRX capable device may also receive an exit command for the connected mode extended DRX configuration from the core network element. Alternatively, the eDRX capable device may be configured to remain in the eDRX mode and wait for the next ON duration to transmit the MO data. In some cases, the eDRX capable device may exit eDRX mode after receiving an exit command from the access point. The exit command may be a MAC CE command received from the access point.

The eDRX capable device may determine that MO data is available for transmission during the low power period. The eDRX capable device may refrain from transmitting an SR for a remaining portion of the low power period subsequent to the determination. The eDRX capable device may transmit an SR for the MO data after activating the radio component. The eDRX capable device may identify an SR reporting configuration based on the extended DRX configuration. The eDRX capable device may also establish an SR reporting configuration based on the extended DRX configuration.

Figure 5:
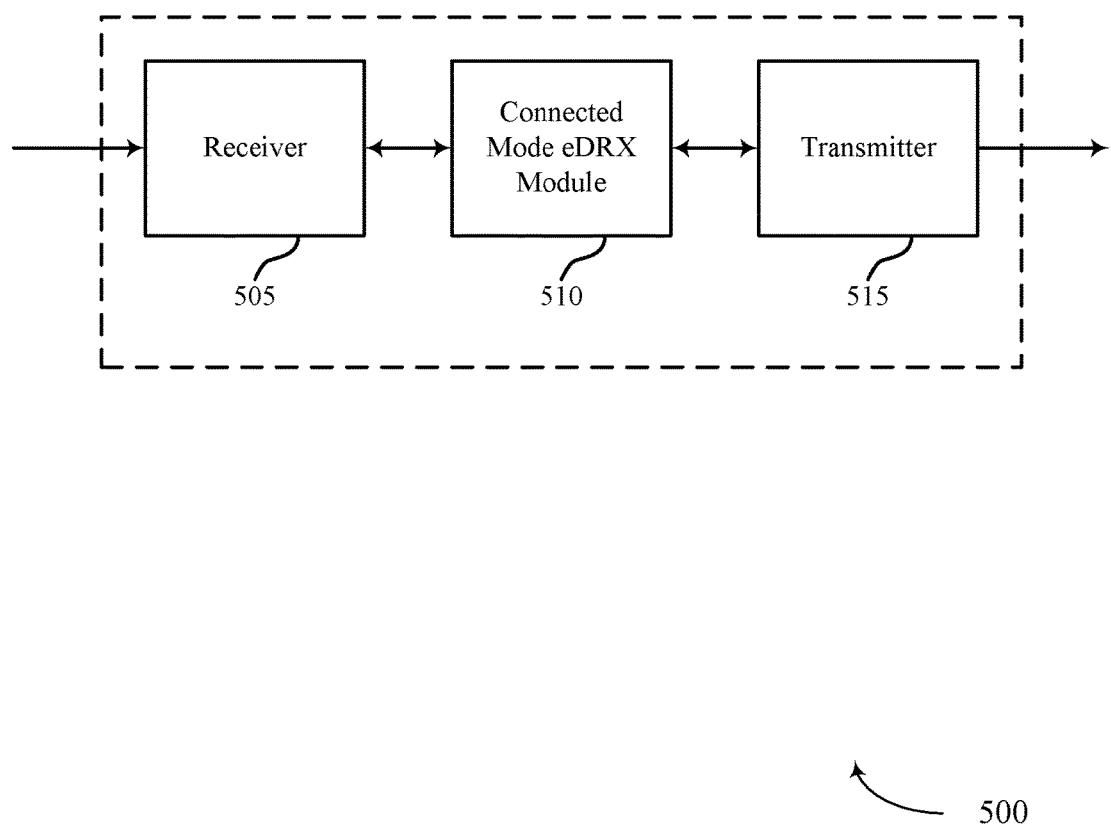
FIG. 5 shows a block diagram of a wireless device that supports connected mode extended DRX in accordance with various aspects of the present disclosure.

FIG. 5 shows a block diagram of a wireless device 500 configured for connected mode extended DRX in accordance with various aspects of the present disclosure. Wireless device 500 may be an example of aspects of a UE 115 described with reference to FIGS. 1-4. Wireless device 500 may include a receiver 505, a connected mode eDRX module 510, or a transmitter 515. Wireless device 500 may also include a processor. Each of these components may be in communication with one another.

The receiver 505 may receive information such as packets, user data, or control information associated with various information channels (e.g., control channels, data channels, and information related to connected mode extended DRX, etc.). Information may be passed on to the connected mode eDRX module 510, and to other components of wireless device 500.

The connected mode eDRX module 510 may enter, or cause the device to enter, a connected mode by establishing an RRC connection with a base station 105. The connected eDRX module may determine a connected mode extended DRX configuration, including a low power period that is longer than a full SFN cycle, and it may deactivate a radio component (e.g., the receiver 505) while in the connected mode for the low power period based on the connected mode extended DRX configuration. The connected mode eDRX module 510 may activate the radio component (e.g., the receiver 505) after the low power period based on the connected mode extended DRX configuration.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
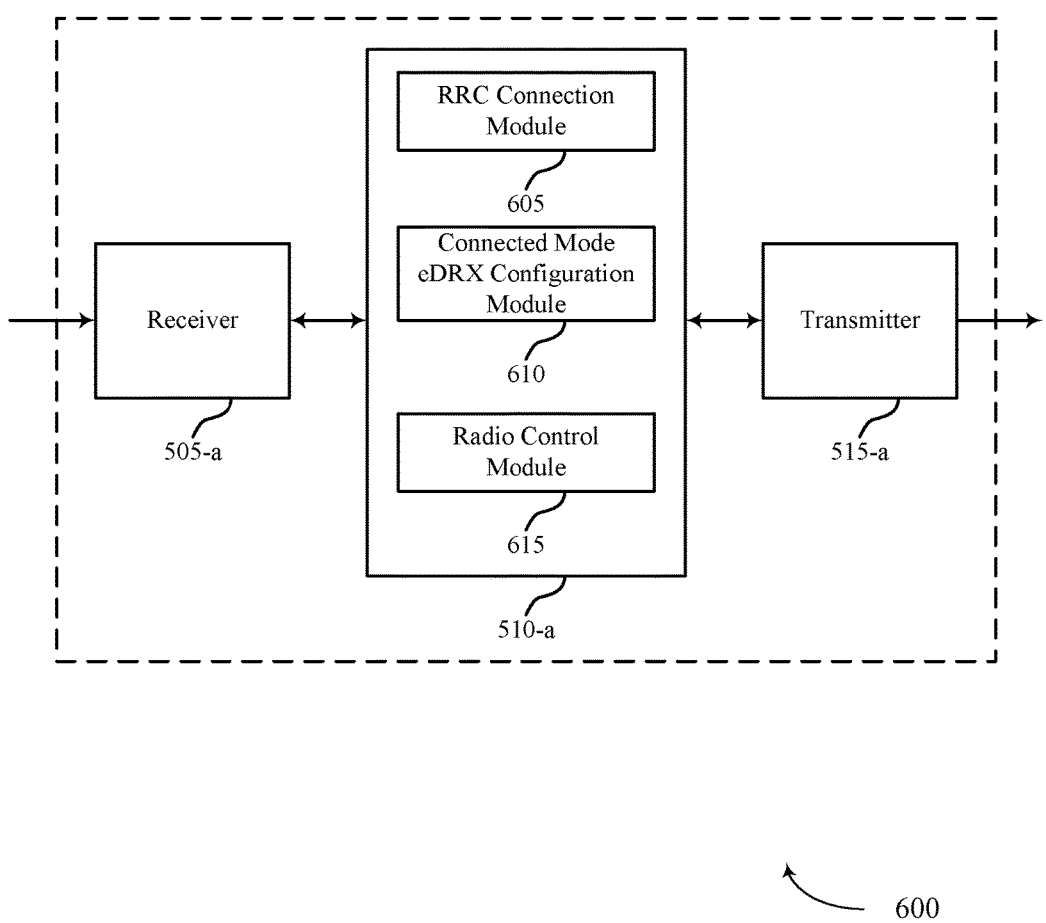
FIG. 6 shows a block diagram of a wireless device that supports connected mode extended DRX in accordance with various aspects of the present disclosure.

FIG. 6 shows a block diagram of a wireless device 600 for connected mode extended DRX in accordance with various aspects of the present disclosure. Wireless device 600 may be an example of aspects of a wireless device 500 or a UE 115 described with reference to FIGS. 1-5. Wireless device 600 may include a receiver 505-*a*, a connected mode eDRX module 510-*a*, or a transmitter 515-*a*. Wireless device 600 may also include a processor. Each of these components may be in communication with one another. The connected mode eDRX module 510-*a* may also include a RRC connection module 605, a connected mode eDRX configuration module 610, and a radio control module 615.

The receiver 505-*a* may receive information which may be passed on to connected mode eDRX module 510-*a*, and to other components of wireless device 600. The connected mode eDRX module 510-*a* may perform the operations described herein with reference to FIG. 5. The transmitter 515-*a* may transmit signals received from other components of wireless device 600.

The RRC connection module 605 may enter a connected mode by establishing an RRC connection with a base station 105 as described herein with reference to FIGS. 1-4. The RRC connection module 605 may also communicate using the RRC connection based on activating the radio component. The RRC connection module 605 may also maintain the RRC connection with the base station 105 during the low power period.

The connected mode eDRX configuration module 610 may determine a connected mode extended DRX configuration including a low power period that is longer than a full SFN cycle as described herein with reference to FIGS. 1-4. The connected mode eDRX configuration module 610 may also transmit an extended DRX message including an extended DRX capability, an extended DRX preference, or both, such that the extended DRX configuration is based on the extended DRX message. In some examples, the extended DRX configuration includes an ON duration based on a MAC rescheduling period.

The radio control module 615 may deactivate a radio component while in the connected mode for the low power period based on the connected mode extended DRX configuration as described herein with reference to FIGS. 2-4. The radio control module 615 may activate the radio component after the low power period based on the connected mode extended DRX configuration.

Figure 7:
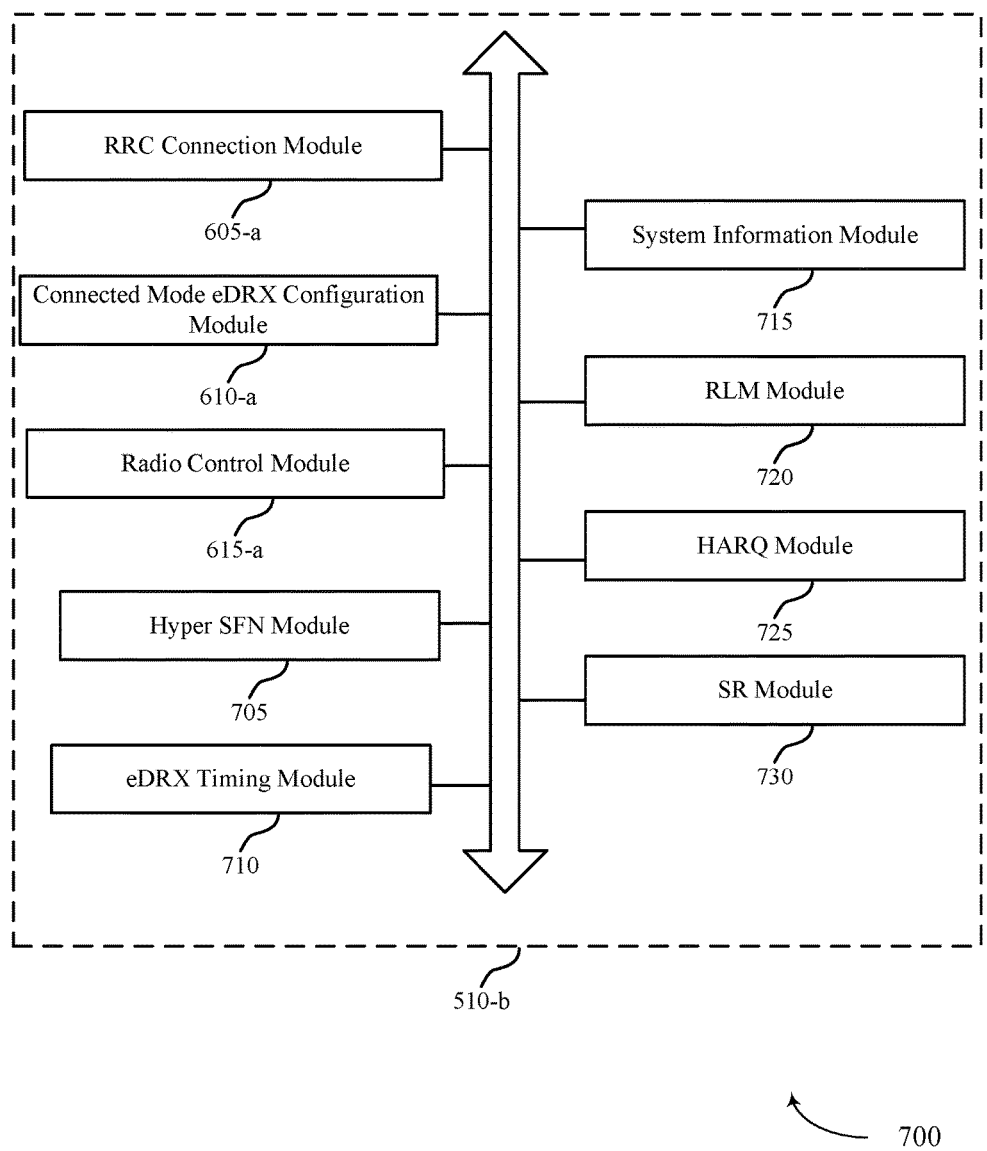
FIG. 7 shows a block diagram of a wireless device that supports connected mode extended DRX in accordance with various aspects of the present disclosure.

FIG. 7 shows a block diagram 700 of a connected mode eDRX module 510-*b* which may be a component of a wireless device 500 or a wireless device 600 for connected mode extended DRX in accordance with various aspects of the present disclosure. The connected mode eDRX module 510-*b* may be an example of aspects of a connected mode eDRX module 510 described with reference to FIGS. 5-6. The connected mode eDRX module 510-*b* may include a RRC connection module 605-*a*, a connected mode eDRX configuration module 610-*a*, and a radio control module 615-*a*. Each of these modules may perform the functions described herein with reference to FIG. 6. The connected mode eDRX module 510-*b* may also include a hyper SFN module 705, an eDRX timing module 710, a system information module 715, an RLM module 720, a HARQ module 725, and an SR module 730.

The hyper SFN module 705 may receive an indication of a hyper SFN, where the hyper SFN indicates a time period equal to or greater than the full SFN cycle as described herein with reference to FIGS. 1-4. In some examples, the indication includes a dedicated signal. In some examples, the indication includes a broadcast signal. The full SFN cycle may include includes a period of 1024 frames, and each frame may include a 10 ms period.

The eDRX timing module 710 may initiate an extended DRX inactivity timer as described herein with reference to FIGS. 1-4. The eDRX timer may be initiated simultaneously with, or subsequent to DRX inactivity timer. The eDRX timing module 710 may also determine that the extended DRX inactivity timer has expired, such that deactivating the radio component is based on the expiration of the extended DRX timer. In some examples, the extended DRX inactivity timer may be initiated simultaneously with a default DRX inactivity timer, and a period of the extended DRX inactivity timer may be longer than a period of the default DRX inactivity timer. The eDRX timing module 710 may also determine that a default DRX timer has expired. In some examples, the extended DRX inactivity timer may be initiated based on the determination that the default DRX timer has expired.

The system information module 715 may receive an indication that system information has changed as described herein with reference to FIGS. 1-4. In some examples, the indication may be associated with a group of UEs configured for extended DRX. The system information module 715 may also transmit or receive an SR message or a RACH message subsequent to activating the radio component, and the indication may be received based on the SR message or the RACH message. In some examples, the indication includes a field in an MTC specific SIB. In some examples, the indication includes a field in SIB1. Additionally or alternatively, the extended DRX configuration may be associated with a system information modification period.

The RLM module 720 may determine an RLM evaluation period associated with the extended DRX configuration as described herein with reference to FIGS. 1-4. The RLM module 720 may also perform a number of RLM measurements during an ON duration associated with the extended DRX configuration based on the RLM evaluation period. The RLM module 720 may also determine that an RLM measurement value is less than a threshold. The RLM module 720 may also perform an additional RLM measurement based on the determination. The RLM module 720 may also identify that an out-of-sync condition based on the RLM measurements. The RLM module 720 may, in some cases, perform a second number of RLM measurements associated with a next RLM evaluation period subsequent to identifying the out-of-sync condition.

The HARQ module 725 may transmit a NACK for a HARQ process as described herein with reference to FIGS. 1-4. The HARQ module 725 may also initiate a retransmission timer. In some examples, the HARQ module 725 may also determine that the retransmission timer has expired prior to receiving a retransmission associated with the HARQ process. The HARQ module 725 may also transmit a retransmission request based on the determination. The HARQ module 725 may also send a retransmission for a HARQ process based on the retransmission request.

The SR module 730 may determine that MO data is available for transmission during the low power period as described herein with reference to FIGS. 1-4. The SR module 730 may then refrain from transmitting an SR for a remaining portion of the low power period subsequent to the determination. The SR module 730 may transmit an SR for the MO data after activating the radio component. In some cases, the SR module 730 may identify an SR reporting configuration based on the extended DRX configuration.

Figure 8:
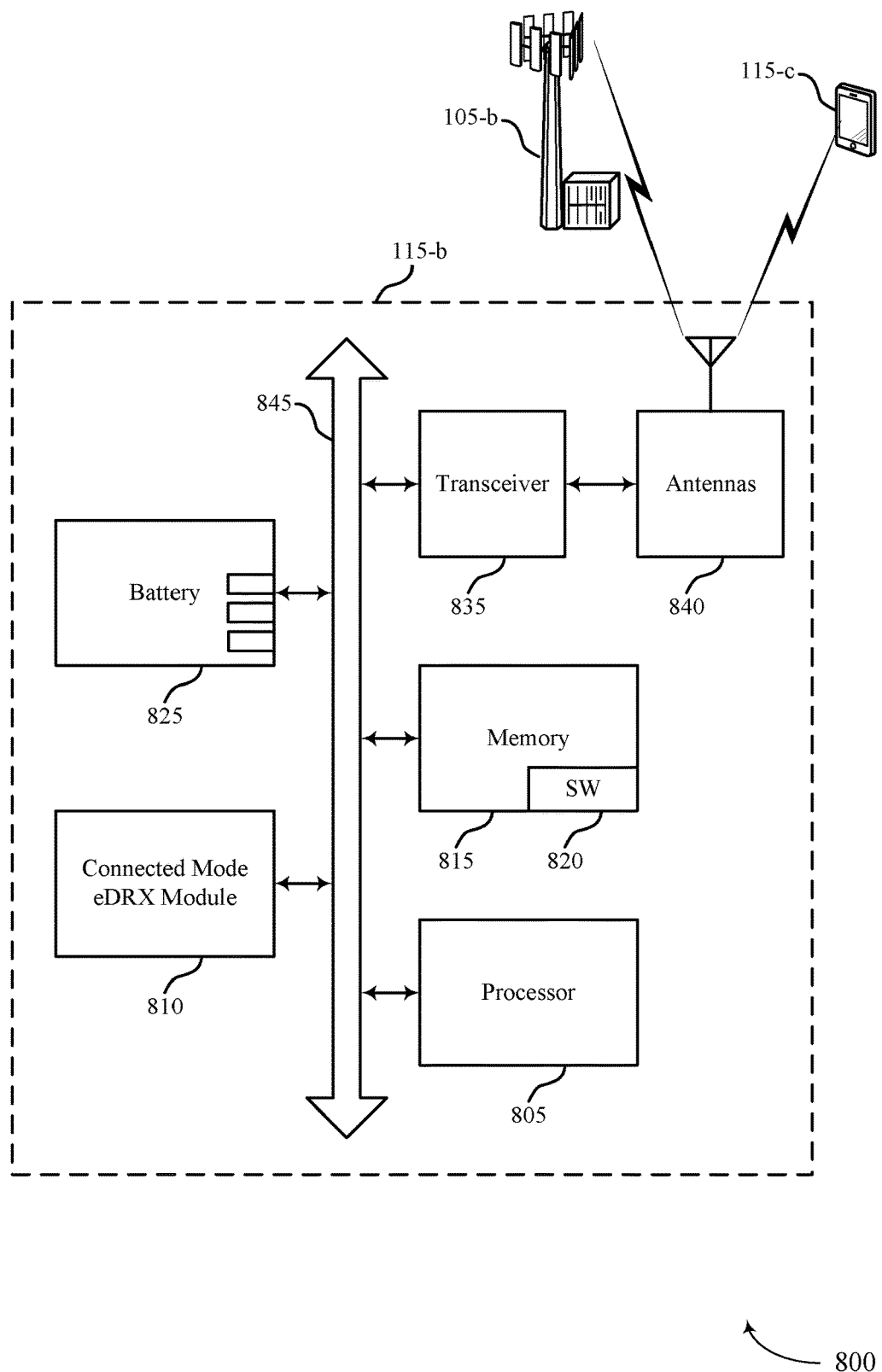
FIG. 8 illustrates a block diagram of a system including a user equipment (UE) that supports connected mode extended DRX in accordance with various aspects of the present disclosure.

FIG. 8 shows a diagram of a system 800 including a UE 115 configured for connected mode extended DRX in accordance with various aspects of the present disclosure. System 800 may include UE 115-*b*, which may be an example of a wireless device 500, a wireless device 600, or a UE 115 described herein with reference to FIGS. 1-7. UE 115-*b* may include a connected mode eDRX module 810, which may be an example of a connected mode eDRX module 510 described with reference to FIGS. 5-7. UE 115-*b* may also include a battery 825. UE 115-*b* may also include components for bi-directional voice and data communications including components for transmitting communications and components for receiving communications. For example, UE 115-*b* may communicate bi-directionally with base station 105-*b* or UE 115-*c*.

In some cases, UE 115-*b* may be designed to operate on the power of battery 825 for an extended period of time. For example, UE 115-*b* may be configured for eDRX to conserve battery power.

UE 115-*b* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*b* may include a single antenna 840, UE 115-*b* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., connected mode extended DRX, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
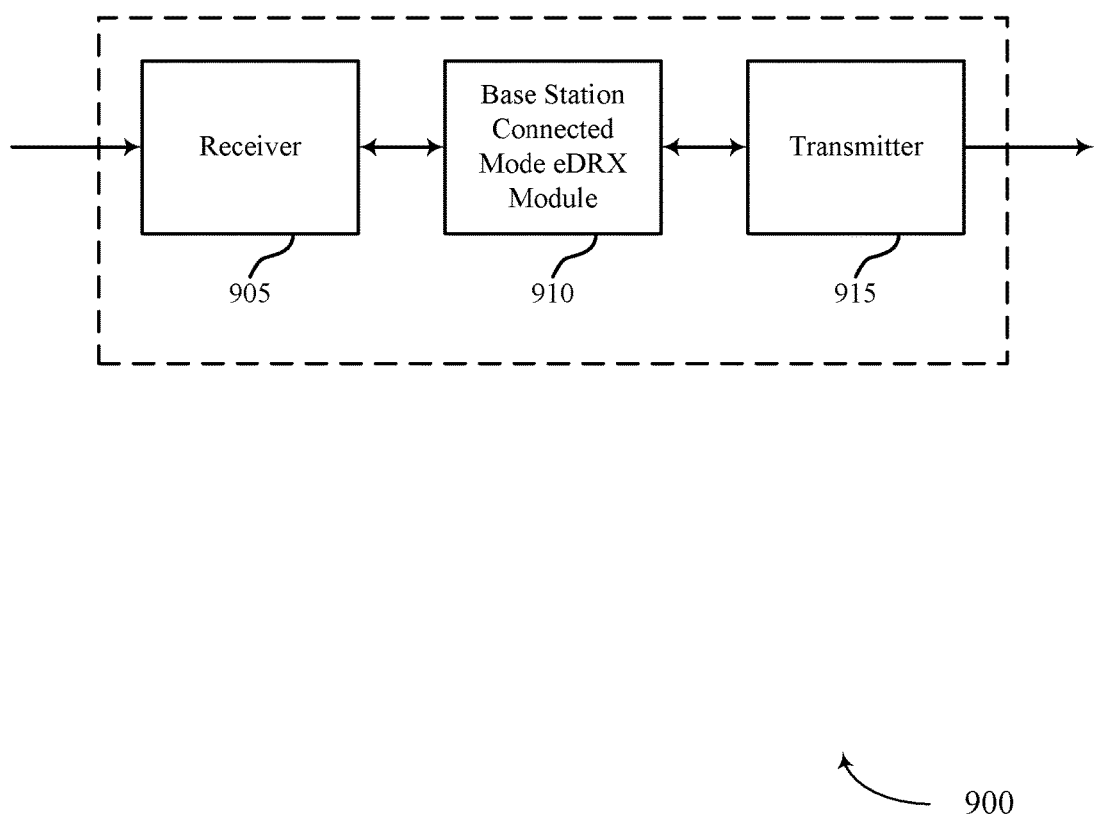
FIG. 9 shows a block diagram of a wireless device that supports connected mode extended DRX in accordance with various aspects of the present disclosure.

FIG. 9 shows a block diagram of a wireless device 900 configured for connected mode extended DRX in accordance with various aspects of the present disclosure. Wireless device 900 may be an example of aspects of a base station 105 described with reference to FIGS. 1-4. Wireless device 900 may include a receiver 905, a base station connected mode eDRX module 910, or a transmitter 915. Wireless device 900 may also include a processor. Each of these components may be in communication with one another.

The receiver 905 may receive information such as packets, user data, or control information associated with various information channels (e.g., control channels, data channels, and information related to connected mode extended DRX, etc.). Information may be passed on to the base station connected mode eDRX module 910, and to other components of wireless device 900.

The base station connected mode eDRX module 910 may establish an RRC connection with a wireless device (e.g., a UE), configure the wireless device for connected mode extended DRX including a low power period that is longer than a full SFN cycle and an ON duration, maintain the RRC connection with the device during the low power period, and communicate with the wireless device after the low power period using the RRC connection during the ON duration.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas. In some examples, the transmitter 915 may communicate with the wireless device after the low power period using the RRC connection during the ON duration.

Figure 10:
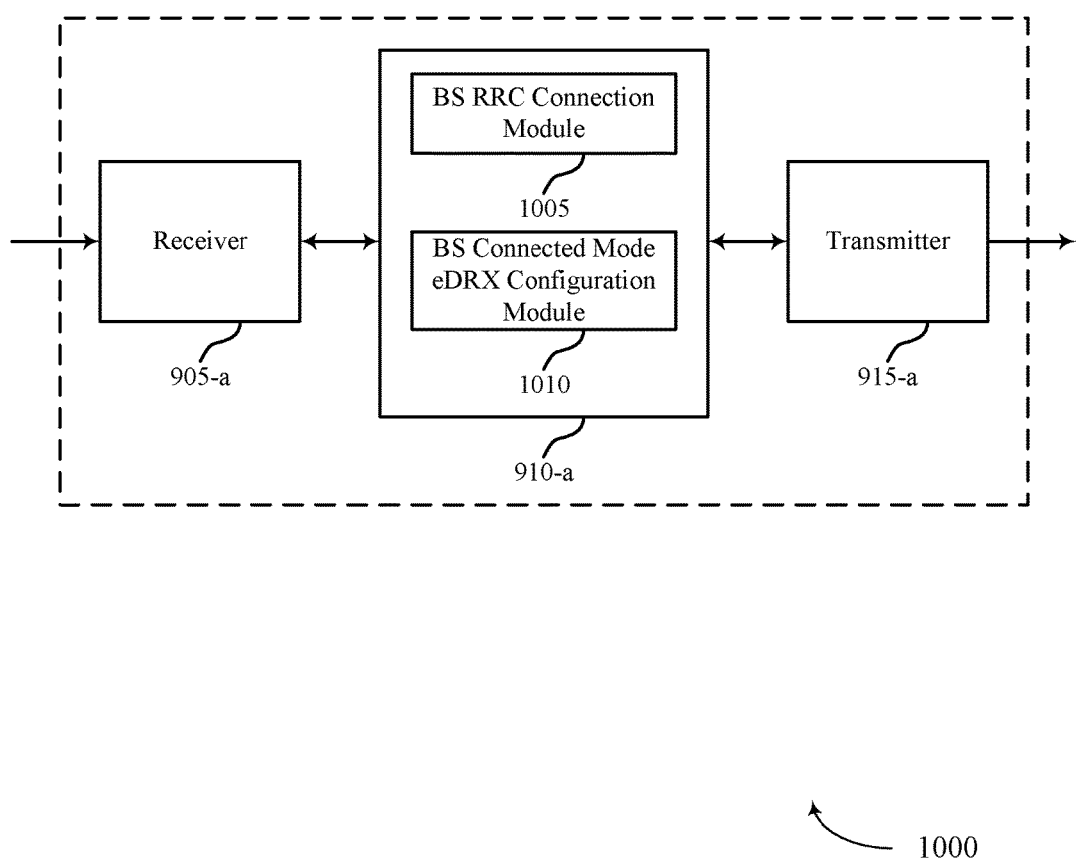
FIG. 10 shows a block diagram of a wireless device that supports connected mode extended DRX in accordance with various aspects of the present disclosure.

FIG. 10 shows a block diagram of a wireless device 1000 for connected mode extended DRX in accordance with various aspects of the present disclosure. Wireless device 1000 may be an example of aspects of a wireless device 900 or a base station 105 described with reference to FIGS. 1-9. Wireless device 1000 may include a receiver 905-*a*, a base station connected mode eDRX module 910-*a*, or a transmitter 915-*a*. Wireless device 1000 may also include a processor. Each of these components may be in communication with one another. The base station (BS) connected mode eDRX module 910-*a* may also include a BS RRC connection module 1005, and a BS connected mode eDRX configuration module 1010.

The receiver 905-*a* may receive information which may be passed on to base station connected mode eDRX module 910-*a*, and to other components of wireless device 1000. The base station connected mode eDRX module 910-*a* may perform the operations described herein with reference to FIG. 9. The transmitter 915-*a* may transmit signals received from other components of wireless device 1000.

The BS RRC connection module 1005 may establish an RRC connection with a wireless device as described herein with reference to FIGS. 1-4.

The BS connected mode eDRX configuration module 1010 may configure the wireless device for connected mode extended DRX including a low power period that is longer than a full SFN cycle and an ON duration as described herein with reference to FIGS. 1-4.

Figure 11:
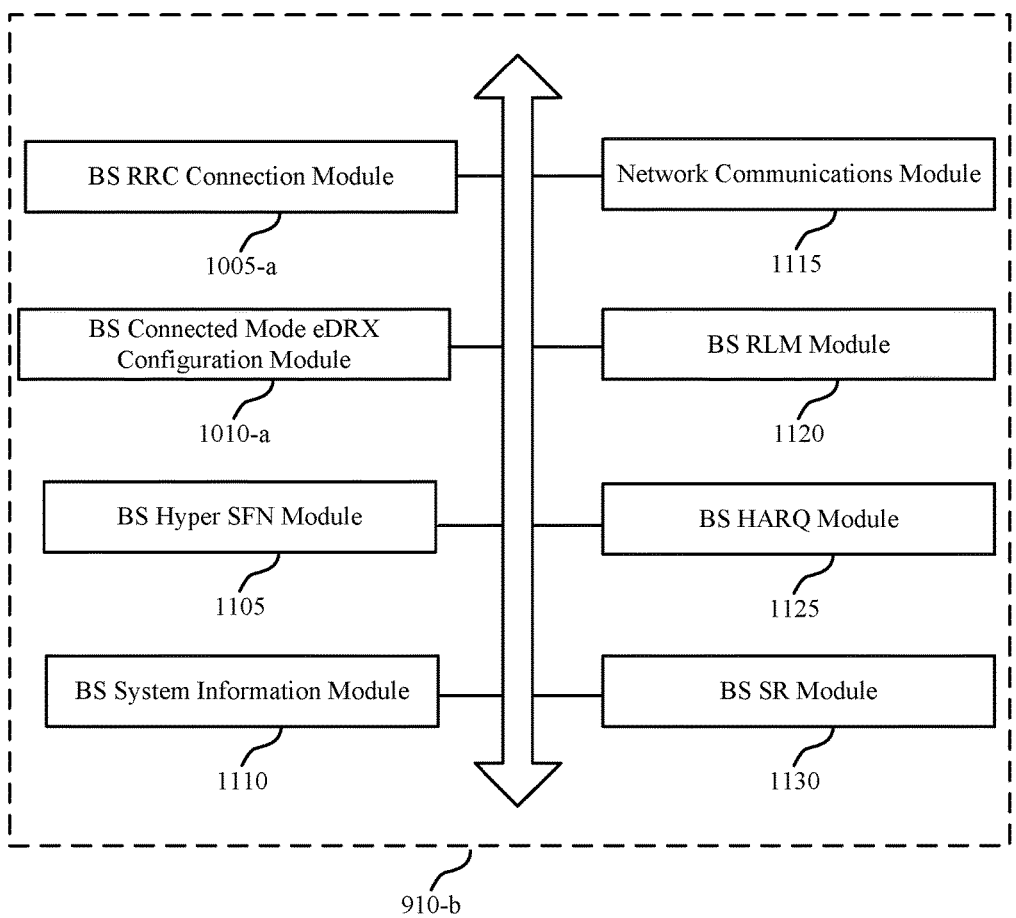
FIG. 11 shows a block diagram of a wireless device that supports connected mode extended DRX in accordance with various aspects of the present disclosure.

FIG. 11 shows a block diagram 1100 of a base station connected mode eDRX module 910-*b* which may be a component of a wireless device 900 or a wireless device 1000 for connected mode extended DRX in accordance with various aspects of the present disclosure. The base station connected mode eDRX module 910-*b* may be an example of aspects of a base station connected mode eDRX module 910 described with reference to FIGS. 9 and 10. The base station connected mode eDRX module 910-*b* may include a BS RRC connection module 1005-*a*, and a BS connected mode eDRX configuration module 1010-*a*. Each of these modules may perform the functions described herein with reference to FIG. 10. The base station connected mode eDRX module 910-*b* may also include a BS hyper SFN module 1105, a BS system information module 1110, a network communications module 1115, a BS RLM module 1120, a BS HARQ module 1125, and a BS SR module 1130.

The BS hyper SFN module 1105 may transmit an indication of a hyper SFN, where the hyper SFN indicates a time period equal to or greater than the full SFN cycle as described herein with reference to FIGS. 1-4.

The BS system information module 1110 may transmit an indication that system information has changed as described herein with reference to FIGS. 1-4.

The network communications module 1115 may transmit an indication that the wireless device is configured for the connected mode extended DRX configuration to a core network element as described herein with reference to FIGS. 1-4. The network communications module 1115 may also transmit an exit indication for the connected mode extended DRX configuration to the core network element. The network communications module 1115 may also receive an exit command for the connected mode extended DRX configuration from the core network element. The network communications module 1115 may also notify a core network element of the extended DRX capability, the extended DRX preference, or both.

The BS RLM module 1120 may determine an RLM evaluation period associated with the extended DRX configuration as described herein with reference to FIGS. 1-4.

The BS HARQ module 1125 may receive a retransmission request associated with a HARQ retransmission timer of a wireless device as described herein with reference to FIGS. 1-4.

The BS SR module 1130 may establish an SR reporting configuration based on the extended DRX configuration as described herein with reference to FIGS. 1-4.

Figure 12:
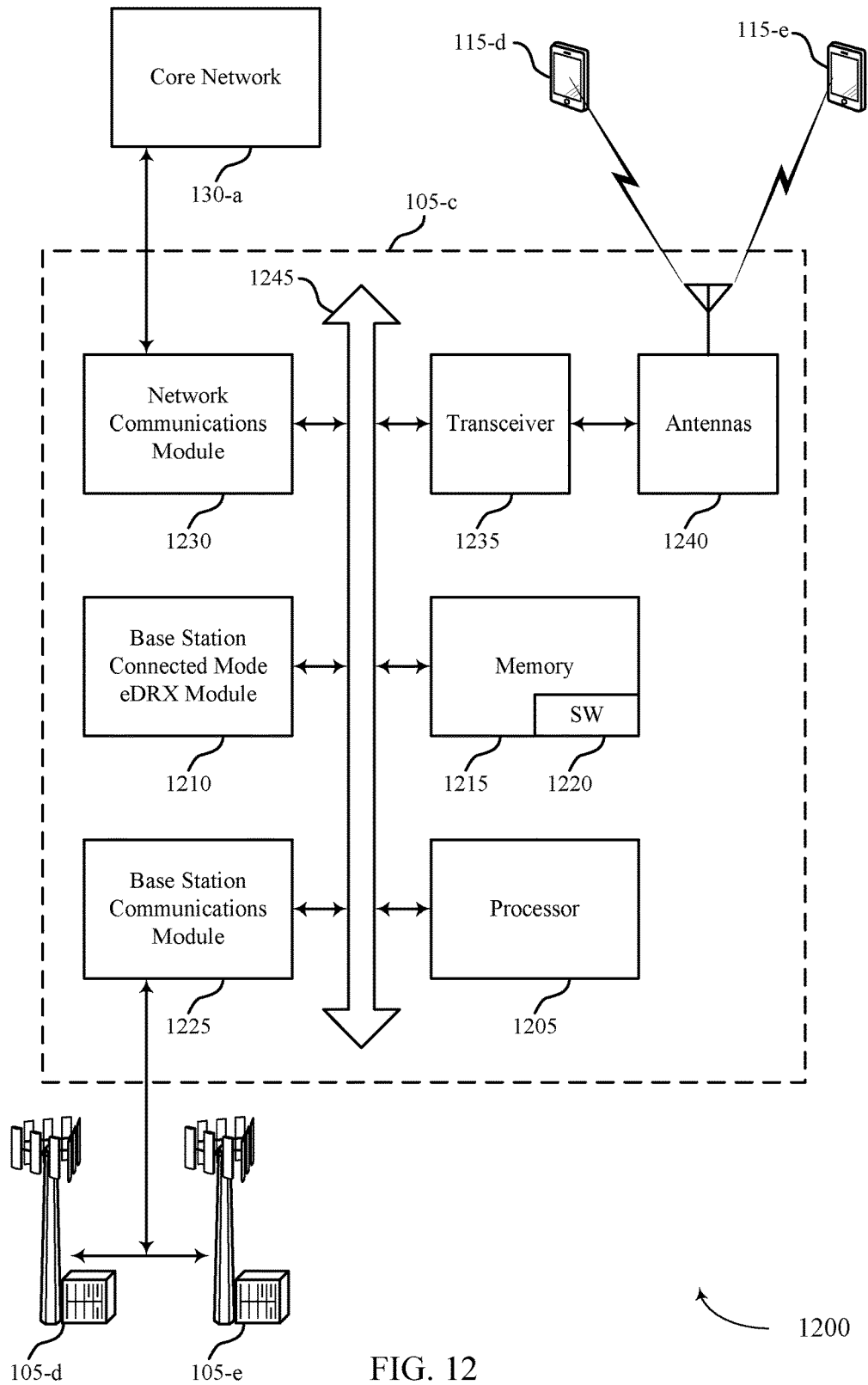
FIG. 12 illustrates a block diagram of a system including a base station that supports connected mode extended DRX in accordance with various aspects of the present disclosure.

FIG. 12 shows a diagram of a system 1200 including a base station 105 configured for connected mode extended DRX in accordance with various aspects of the present disclosure. System 1200 may include base station 105-c, which may be an example of a wireless device 900, a wireless device 1000, or a base station 105 described herein with reference to FIGS. 1, 2 and 9-11. Base station 105-c may include a base station connected mode eDRX module 1210, which may be an example of a base station connected mode eDRX module 910 described with reference to FIGS. 9-11. Base station 105-c may also include components for bi-directional voice and data communications including components for transmitting communications and components for receiving communications. For example, base station 105-c may communicate bi-directionally with base station 105-d, base station 105-e, UE 115-d or UE 115-e.

In some cases, base station 105-c may have one or more wired backhaul links. Base station 105-c may have a wired backhaul link (e.g., S1 interface, etc.) to the core network 130. Base station 105-c may also communicate with other base stations 105, such as base station 105-d and base station 105-e via inter-base station backhaul links (e.g., an X2 interface). Each of the base stations 105 may communicate with UEs 115 using the same or different wireless communications technologies. In some cases, base station 105-c may communicate with other base stations such as 105-d or 105-e utilizing base station communication module 1225. In some examples, base station communication module 1225 may provide an X2 interface within an LTE/LTE-A wireless communication network technology to provide communication between some of the base stations 105. In some examples, base station 105-c may communicate with other base stations through core network 130. In some cases, base station 105-c may communicate with the core network 130 through network communications module 1230.

The base station 105-c may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-c) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-c may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1210 to perform various functions described herein (e.g., connected mode extended DRX, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

The components of system 800, system 1200, wireless device 500, wireless device 600, wireless device 900, wireless device 1000, connected mode eDRX module 510-b, or base station connected mode eDRX module 910-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 13:
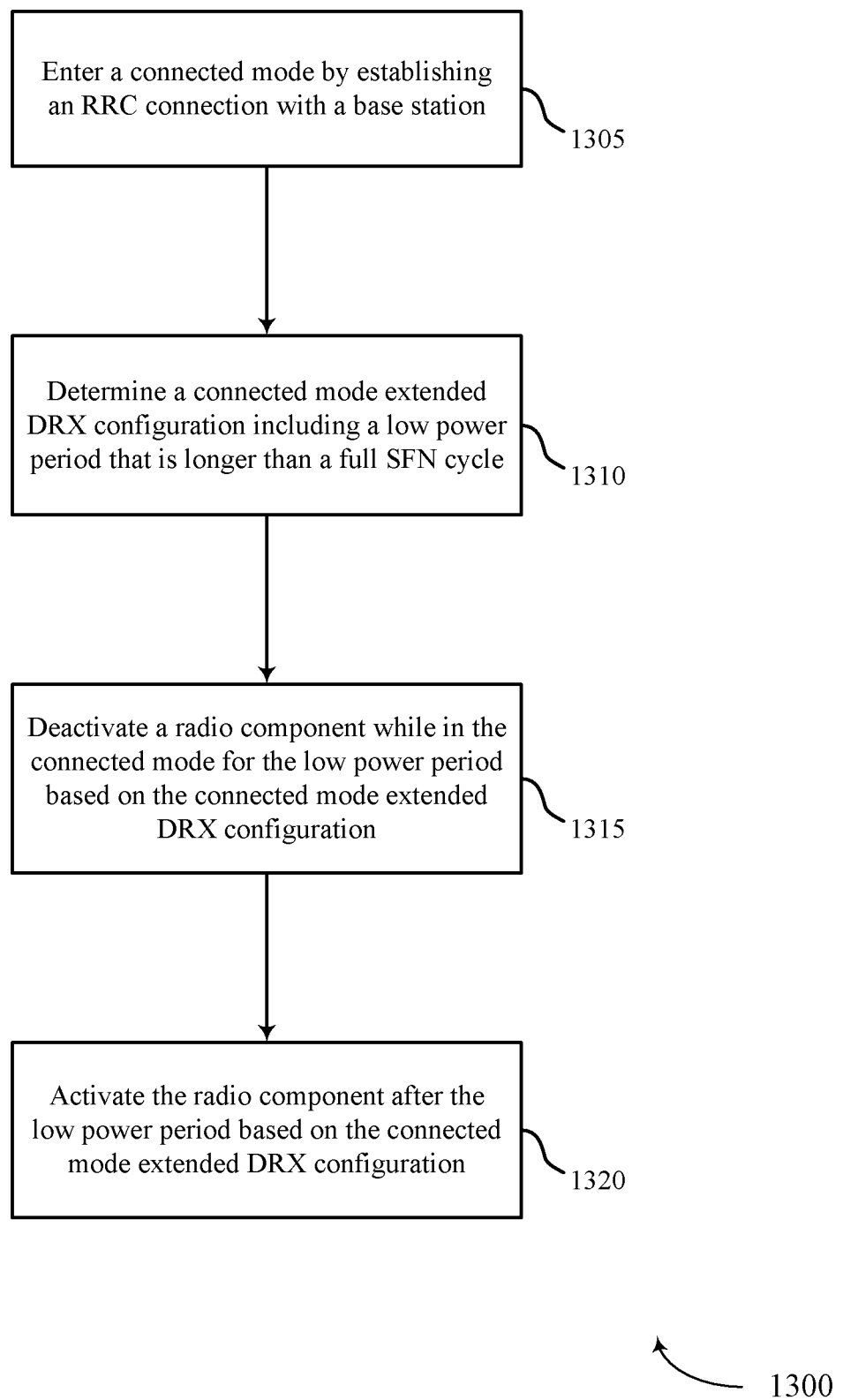
FIG. 13 illustrates a method for connected mode extended DRX in accordance with various aspects of the present disclosure.

FIG. 13 shows a flowchart illustrating a method 1300 for connected mode extended DRX in accordance with various aspects of the present disclosure. The operations of method 1300 may be implemented by a UE 115 or its components as described with reference to FIGS. 1-12. For example, the operations of method 1300 may be performed by the connected mode eDRX module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may enter a connected mode by establishing an RRC connection with a base station as described herein with reference to FIGS. 1-4. In certain examples, the operations of block 1305 may be performed by the RRC connection module 605 as described herein with reference to FIG. 6.

At block 1310, the UE 115 may determine a connected mode extended DRX configuration including a low power period that is longer than a full SFN cycle as described herein with reference to FIGS. 1-4. In certain examples, the operations of block 1310 may be performed by the connected mode eDRX configuration module 610 as described herein with reference to FIG. 6.

At block 1315, the UE 115 may deactivate at least one radio component while in the connected mode for the low power period based on the connected mode extended DRX configuration as described herein with reference to FIGS. 1-4. In certain examples, the operations of block 1315 may be performed by the radio control module 615 as described herein with reference to FIG. 6.

At block 1320, the UE 115 may activate the at least one radio component after the low power period based on the connected mode extended DRX configuration as described herein with reference to FIGS. 1-4. In certain examples, the operations of block 1320 may be performed by the radio control module 615 as described herein with reference to FIG. 6.

Figure 14:
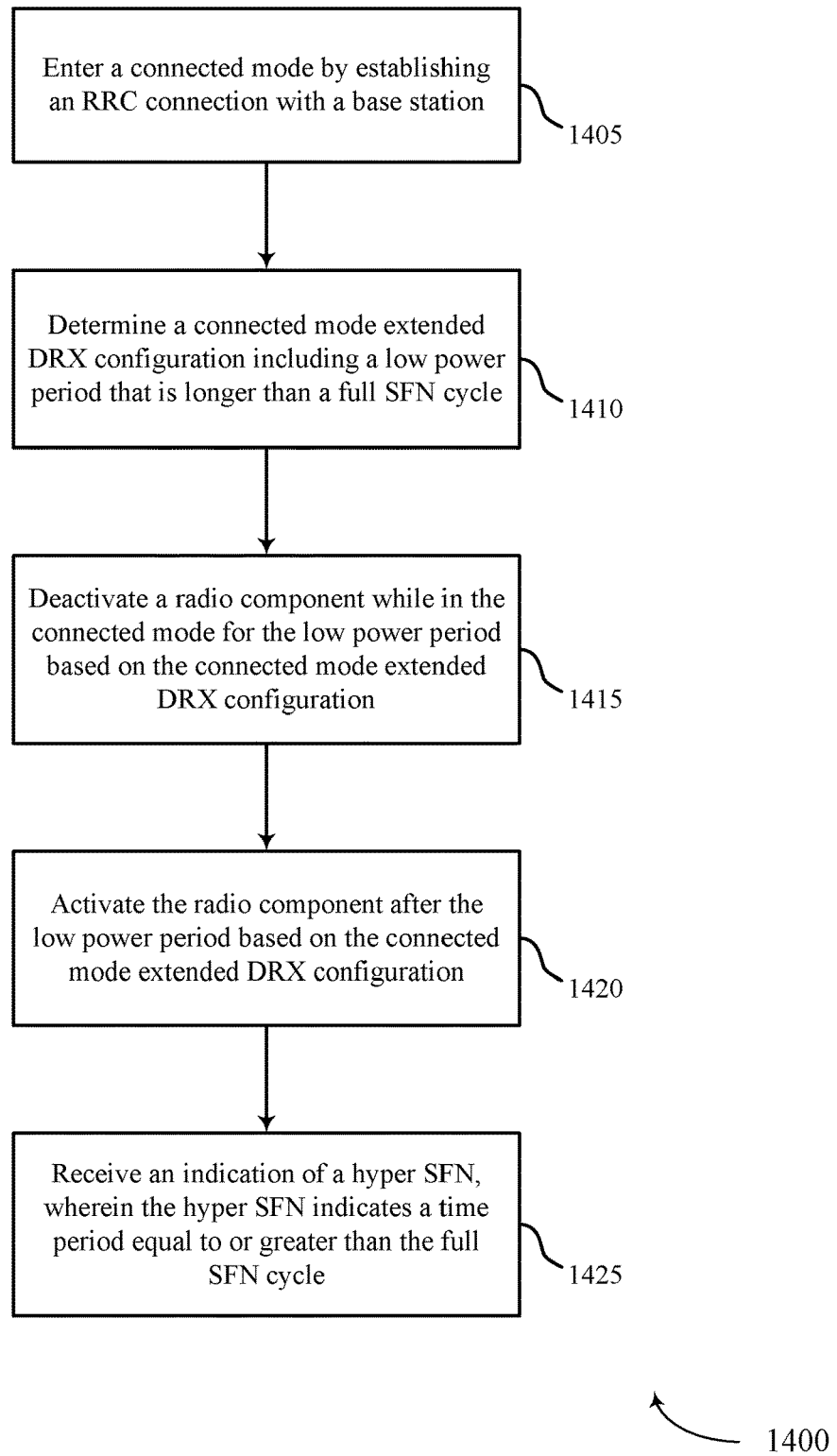
FIG. 14 illustrates a method for connected mode extended DRX in accordance with various aspects of the present disclosure.

FIG. 14 shows a flowchart illustrating a method 1400 for connected mode extended DRX in accordance with various aspects of the present disclosure. The operations of method 1400 may be implemented by a UE 115 or its components as described with reference to FIGS. 1-12. For example, the operations of method 1400 may be performed by the connected mode eDRX module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may enter a connected mode by establishing an RRC connection with a base station as described herein with reference to FIGS. 1-4. In certain examples, the operations of block 1405 may be performed by the RRC connection module 605 as described herein with reference to FIG. 6.

At block 1410, the UE 115 may determine a connected mode extended DRX configuration including a low power period that is longer than a full SFN cycle as described herein with reference to FIGS. 1-4. In certain examples, the operations of block 1410 may be performed by the connected mode eDRX configuration module 610 as described herein with reference to FIG. 6.

At block 1415, the UE 115 may deactivate at least one radio component while in the connected mode for the low power period based on the connected mode extended DRX configuration as described herein with reference to FIGS. 1-4. In certain examples, the operations of block 1415 may be performed by the radio control module 615 as described herein with reference to FIG. 6.

At block 1420, the UE 115 may activate the at least one radio component after the low power period based on the connected mode extended DRX configuration as described herein with reference to FIGS. 2-4. In certain examples, the operations of block 1420 may be performed by the radio control module 615 as described herein with reference to FIG. 6.

At block 1425, the UE 115 may receive an indication of a hyper SFN, where the hyper SFN indicates a time period equal to or greater than the full SFN cycle as described herein with reference to FIGS. 2-4. In certain examples, the operations of block 1425 may be performed by the hyper SFN module 705 as described herein with reference to FIG. 7.

Figure 15:
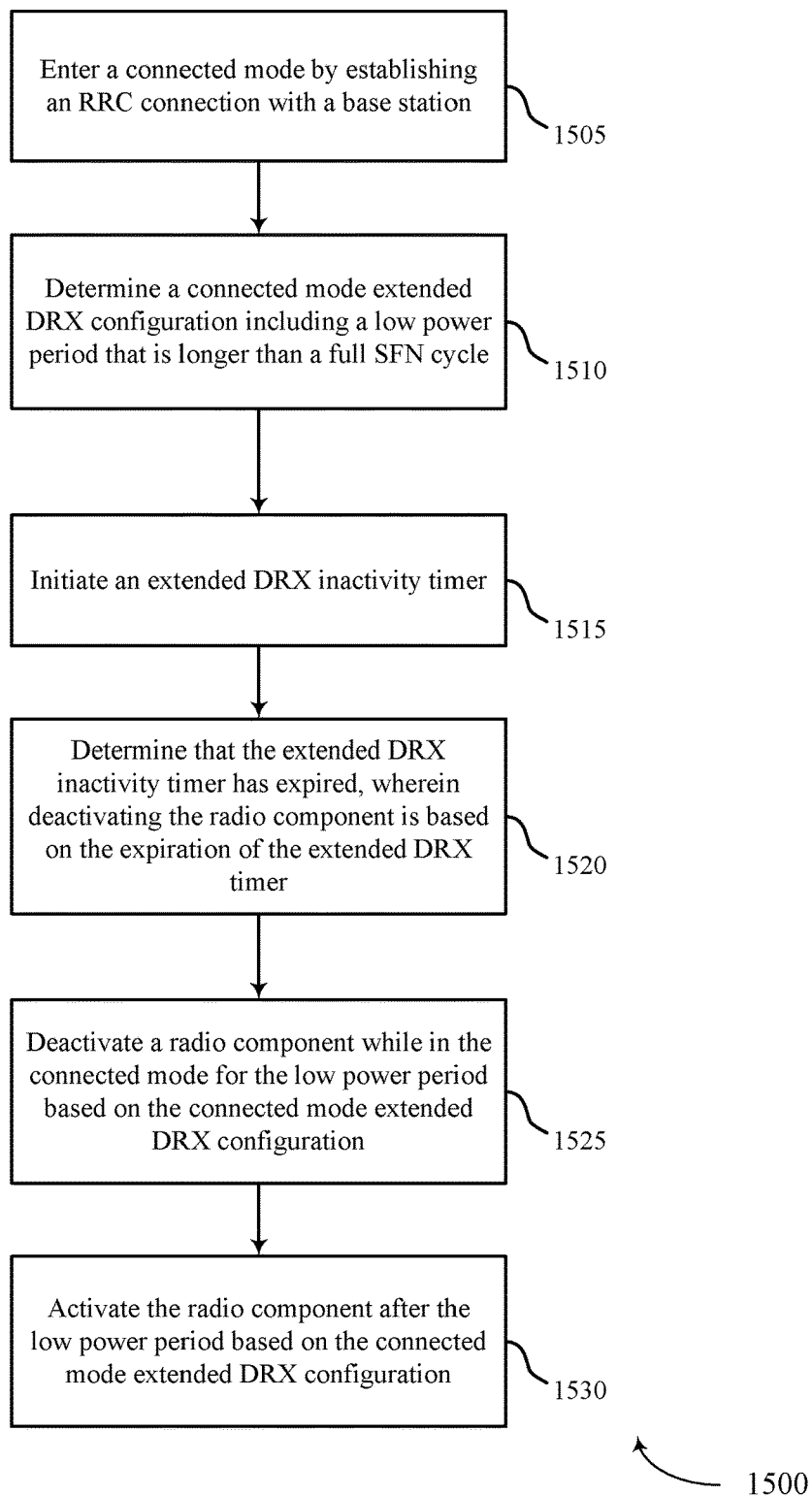
FIG. 15 illustrates a method for connected mode extended DRX in accordance with various aspects of the present disclosure.

FIG. 15 shows a flowchart illustrating a method 1500 for connected mode extended DRX in accordance with various aspects of the present disclosure. The operations of method 1500 may be implemented by a UE 115 or its components as described with reference to FIGS. 1-12. For example, the operations of method 1500 may be performed by the connected mode eDRX module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 or 1400 of FIGS. 13 and 14.

At block 1505, the UE 115 may enter a connected mode by establishing an RRC connection with a base station as described herein with reference to FIGS. 2-4. In certain examples, the operations of block 1505 may be performed by the RRC connection module 605 as described herein with reference to FIG. 6.

At block 1510, the UE 115 may determine a connected mode extended DRX configuration including a low power period that is longer than a full SFN cycle as described herein with reference to FIGS. 1-4. In certain examples, the operations of block 1510 may be performed by the connected mode eDRX configuration module 610 as described herein with reference to FIG. 6.

At block 1515, the UE 115 may initiate an extended DRX inactivity timer as described herein with reference to FIGS. 1-4. In certain examples, the operations of block 1515 may be performed by the eDRX timing module 710 as described herein with reference to FIG. 7.

At block 1520, the UE 115 may determine that the extended DRX inactivity timer has expired, and deactivating the at least one radio component is based on the expiration of the extended DRX timer as described herein with reference to FIGS. 1-4. In certain examples, the operations of block 1520 may be performed by the eDRX timing module 710 as described herein with reference to FIG. 7.

At block 1525, the UE 115 may deactivate at least one radio component while in the connected mode for the low power period based on the connected mode extended DRX configuration as described herein with reference to FIGS. 1-4. In certain examples, the operations of block 1525 may be performed by the radio control module 615 as described herein with reference to FIG. 6.

At block 1530, the UE 115 may activate the at least one radio component after the low power period based on the connected mode extended DRX configuration as described herein with reference to FIGS. 1-4. In certain examples, the operations of block 1530 may be performed by the radio control module 615 as described herein with reference to FIG. 6.

Figure 16:
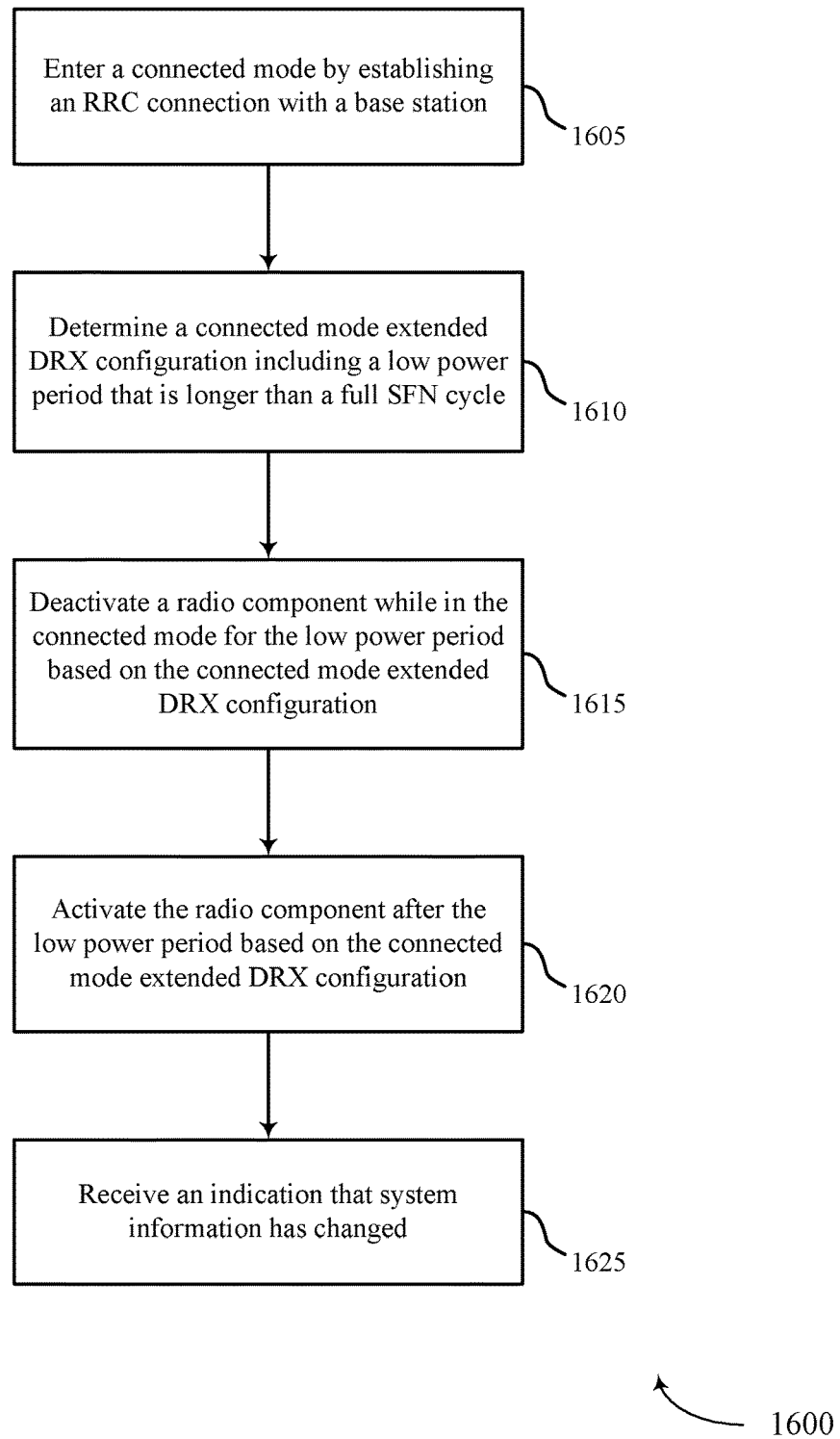
FIG. 16 illustrates a method for connected mode extended DRX in accordance with various aspects of the present disclosure.

FIG. 16 shows a flowchart illustrating a method 1600 for connected mode extended DRX in accordance with various aspects of the present disclosure. The operations of method 1600 may be implemented by a UE 115 or its components as described with reference to FIGS. 1-12. For example, the operations of method 1600 may be performed by the connected mode eDRX module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, or 1500 of FIGS. 13-15.

At block 1605, the UE 115 may enter a connected mode by establishing an RRC connection with a base station as described herein with reference to FIGS. 1-4. In certain examples, the operations of block 1605 may be performed by the RRC connection module 605 as described herein with reference to FIG. 6.

At block 1610, the UE 115 may determine a connected mode extended DRX configuration including a low power period that is longer than a full SFN cycle as described herein with reference to FIGS. 1-4. In certain examples, the operations of block 1610 may be performed by the connected mode eDRX configuration module 610 as described herein with reference to FIG. 6.

At block 1615, the UE 115 may deactivate at least one radio component while in the connected mode for the low power period based on the connected mode extended DRX configuration as described herein with reference to FIGS. 1-4. In certain examples, the operations of block 1615 may be performed by the radio control module 615 as described herein with reference to FIG. 6.

At block 1620, the UE 115 may activate the at least one radio component after the low power period based on the connected mode extended DRX configuration as described herein with reference to FIGS. 1-4. In certain examples, the operations of block 1620 may be performed by the radio control module 615 as described herein with reference to FIG. 6.

At block 1625, the UE 115 may receive an indication that system information has changed as described herein with reference to FIGS. 1-4. In certain examples, the operations of block 1625 may be performed by the system information module 715 as described herein with reference to FIG. 7.

Figure 17:
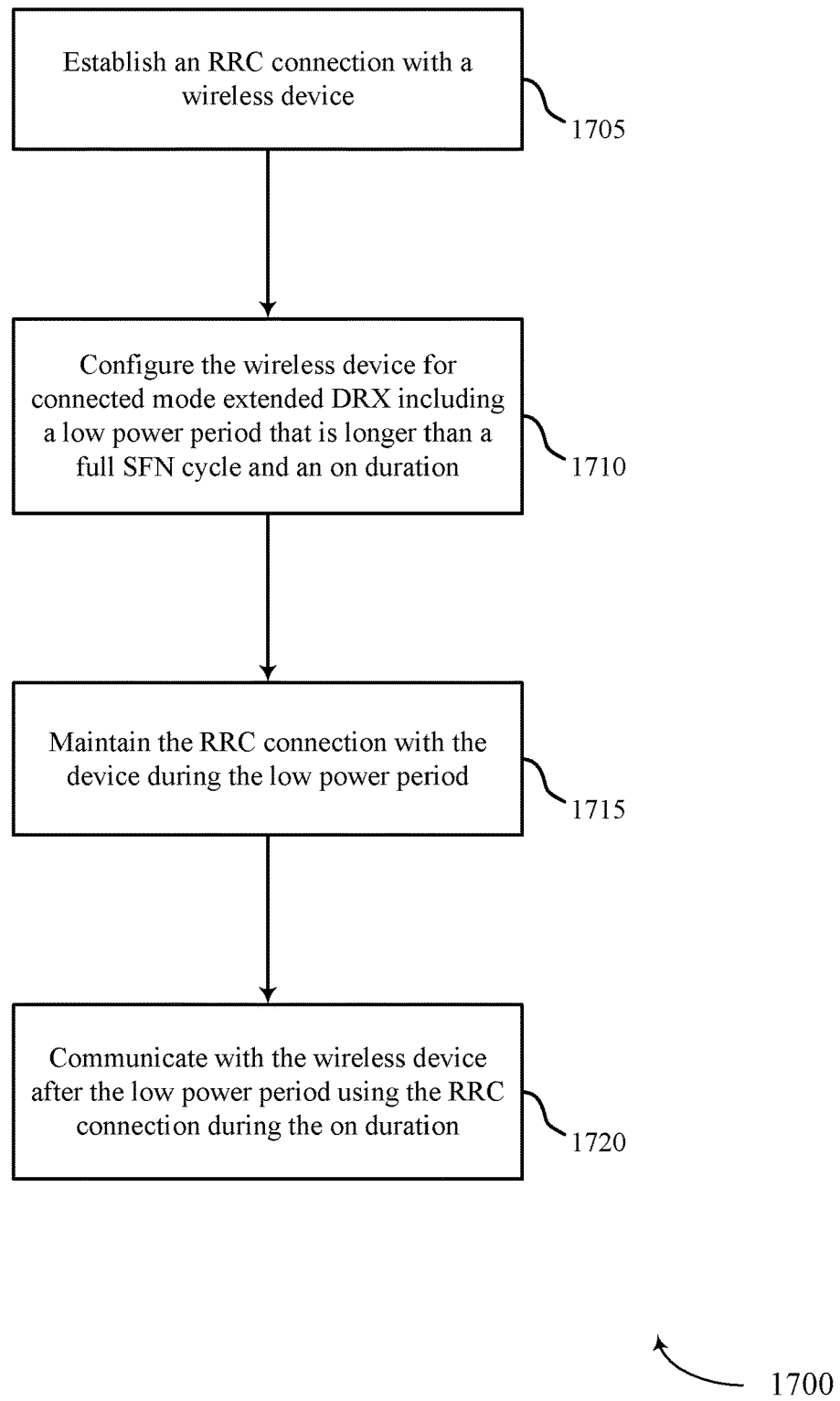
FIG. 17 illustrates a method for connected mode extended DRX in accordance with various aspects of the present disclosure.

FIG. 17 shows a flowchart illustrating a method 1700 for connected mode extended DRX in accordance with various aspects of the present disclosure. The operations of method 1700 may be implemented by a base station 105 or its components as described with reference to FIGS. 1-12. For example, the operations of method 1700 may be performed by the base station connected mode eDRX module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1705, the base station 105 may establish an RRC connection with a wireless device as described herein with reference to FIGS. 1-4. In certain examples, the operations of block 1705 may be performed by the BS RRC connection module 1005 as described herein with reference to FIG. 10.

At block 1710, the base station 105 may configure the wireless device for connected mode extended DRX including a low power period that is longer than a full SFN cycle and an ON duration as described herein with reference to FIGS. 1-4. In certain examples, the operations of block 1710 may be performed by the BS connected mode eDRX configuration module 1010 as described herein with reference to FIG. 10.

At block 1715, the base station 105 may maintain the RRC connection with the device during the low power period as described herein with reference to FIGS. 1-4. In certain examples, the operations of block 1715 may be performed by the RRC connection module 605 as described herein with reference to FIG. 6.

At block 1720, the base station 105 may communicate with the wireless device after the low power period using the RRC connection during the ON duration as described herein with reference to FIGS. 1-4. In certain examples, the operations of block 1720 may be performed by the transmitter 915 as described herein with reference to FIG. 9.

Figure 18:
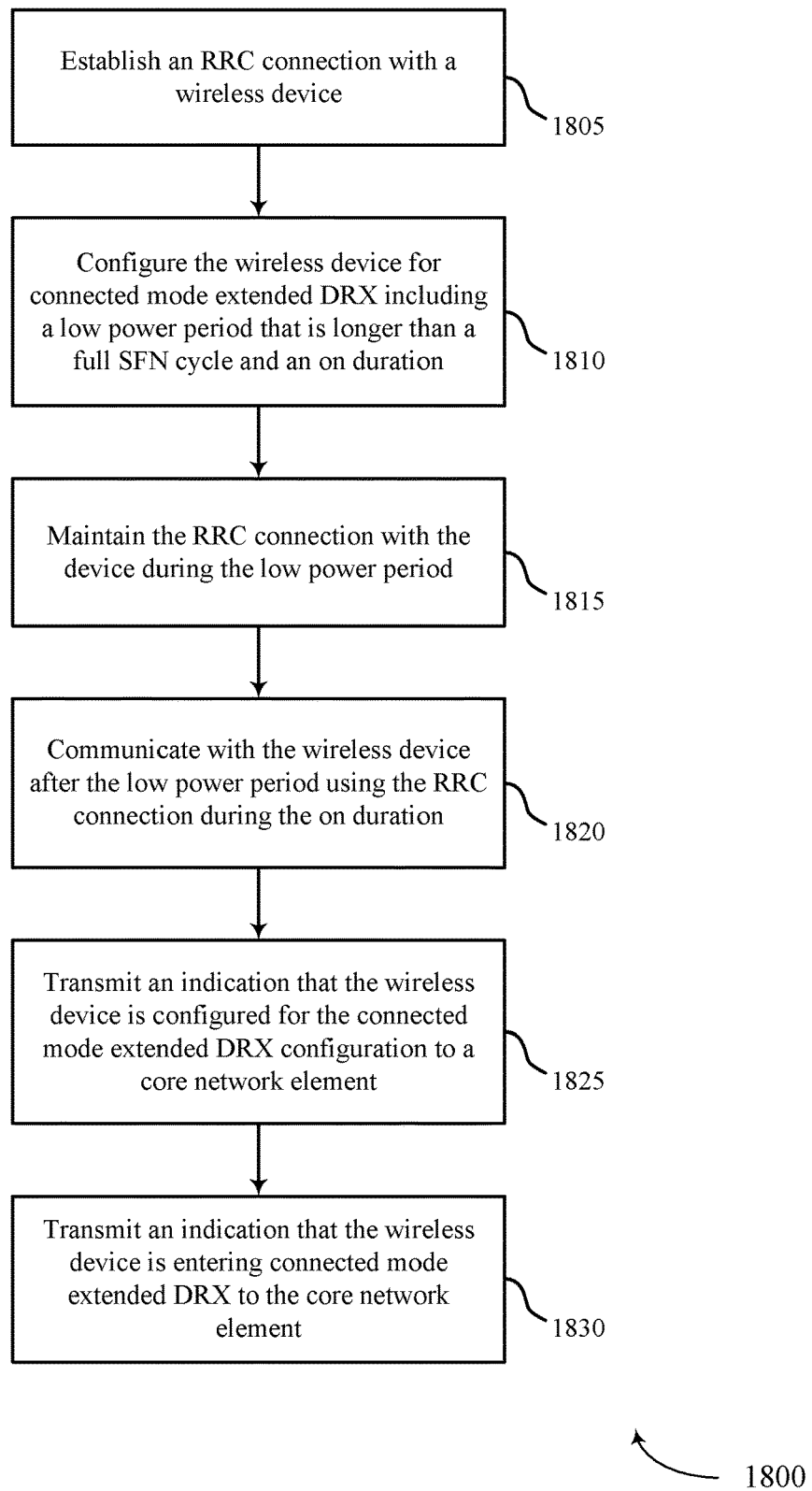
FIG. 18 illustrates a method for connected mode extended DRX in accordance with various aspects of the present disclosure.

FIG. 18 shows a flowchart illustrating a method 1800 for connected mode extended DRX in accordance with various aspects of the present disclosure. The operations of method 1800 may be implemented by a base station 105 or its components as described with reference to FIGS. 1-12. For example, the operations of method 1800 may be performed by the base station connected mode eDRX module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of method 1700 of FIG. 17.

At block 1805, the base station 105 may establish an RRC connection with a wireless device as described herein with reference to FIGS. 1-4. In certain examples, the operations of block 1805 may be performed by the BS RRC connection module 1005 as described herein with reference to FIG. 10.

At block 1810, the base station 105 may configure the wireless device for connected mode extended DRX including a low power period that is longer than a full SFN cycle and an ON duration as described herein with reference to FIGS. 1-4. In certain examples, the operations of block 1810 may be performed by the BS connected mode eDRX configuration module 1010 as described herein with reference to FIG. 10.

At block 1815, the base station 105 may maintain the RRC connection with the device during the low power period as described herein with reference to FIGS. 1-4. In certain examples, the operations of block 1815 may be performed by the RRC connection module 605 as described herein with reference to FIG. 6.

At block 1820, the base station 105 may communicate with the wireless device after the low power period using the RRC connection during the ON duration as described herein with reference to FIGS. 1-4. In certain examples, the operations of block 1820 may be performed by the transmitter 915 as described herein with reference to FIG. 9.

At block 1825, the base station 105 may transmit an indication that the wireless device is configured for the connected mode extended DRX configuration to a core network element as described herein with reference to FIGS. 1-4. In certain examples, the operations of block 1825 may be performed by the network communications module 1115 as described herein with reference to FIG. 11.

At block 1830, the base station 105 may transmit an initiation that the device is entering eDRX mode (or, subsequently, an exit indication for the connected mode extended DRX configuration) to the core network element as described herein with reference to FIGS. 2-4. In certain examples, the operations of block 1830 may be performed by the network communications module 1115 as described herein with reference to FIG. 11.

Thus, methods 1300, 1400, 1500, 1600, 1700, and 1800 may provide for connected mode extended DRX. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The detailed description set forth above in connection with the appended drawings describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP).

CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
   entering a connected mode by establishing a radio resource control (RRC) connection with a base station;
   determining a connected mode extended discontinuous reception (DRX) configuration comprising a low power period that is longer than a full system frame number (SFN) cycle;
   initiating a default DRX inactivity timer and an extended DRX inactivity timer having a period longer than a period of the default DRX inactivity timer;
   deactivating at least one radio component while in the connected mode for the low power period based at least in part on the connected mode extended DRX configuration and on an expiration of the extended DRX inactivity timer; and
   activating the at least one radio component after the low power period based at least in part on the connected mode extended DRX configuration.

2. The method of claim 1, further comprising:
   receiving an indication of a hyper SFN, wherein the hyper SFN indicates a time period equal to or greater than the full SFN cycle, wherein the indication comprises at least one of a dedicated signal and a broadcast signal.

3. The method of claim 1, wherein the extended DRX inactivity timer is initiated simultaneously with the default DRX inactivity timer.

4. The method of claim 1, further comprising:
   determining that the default DRX inactivity timer has expired, wherein the extended DRX inactivity timer is initiated based at least in part on the determination that the default DRX timer has expired.

5. The method of claim 1, further comprising:
   communicating using the RRC connection based at least in part on activating the at least one radio component.

6. The method of claim 1, further comprising:
   receiving an indication that system information has changed.

7. The method of claim 6, wherein the indication is associated with a group of user equipment (UEs) configured for extended DRX.

8. The method of claim 6, wherein the indication comprises at least one of a field in a machine type communication (MTC) specific system information block (SIB) and a field in a system information block 1 (SIB1).

9. The method of claim 1, wherein the connected mode extended DRX configuration is associated with a system information modification period.

10. The method of claim 1, further comprising:
    determining a radio link monitoring (RLM) evaluation period associated with the connected mode extended DRX configuration; and
    performing a number of RLM measurements during an on duration associated with the connected mode extended DRX configuration based at least in part on the RLM evaluation period, wherein additional samples may be taken during an extended DRX cycle to shorten the RLM evaluation period.

11. The method of claim 10, further comprising:
    determining that an RLM measurement value is less than a threshold; and
    performing an additional RLM measurement based at least in part on the determination that the RLM measurement value is less than the threshold.

12. The method of claim 10, further comprising:
    identifying an out-of-sync condition based at least in part on the RLM measurements; and
    performing a second number of RLM measurements associated with a next RLM evaluation period subsequent to identifying the out-of-sync condition.

13. The method of claim 1, further comprising:
    transmitting an extended DRX message comprising an extended DRX capability, an extended DRX preference, or both, wherein the connected mode extended DRX configuration is based at least in part on the extended DRX message.

14. The method of claim 1, wherein the connected mode extended DRX configuration comprises an on duration based at least in part on a medium access control (MAC) rescheduling period.

15. The method of claim 1, further comprising:
    transmitting a negative acknowledgement (NACK) for a hybrid automatic repeat request (HARQ) process;
    initiating a retransmission timer;
    determining that the retransmission timer has expired prior to receiving a retransmission associated with the HARQ process; and
    transmitting a retransmission request based at least in part on the determination that the retransmission timer has expired prior to receiving the retransmission associated with the HARQ process.

16. The method of claim 1, further comprising:
    determining that mobile originated (MO) data is available for transmission during the low power period;
    refraining from transmitting a scheduling request (SR) for a remaining portion of the low power period subsequent to the determination that the MO data is available for transmission during the low power period; and
    transmitting an SR for the MO data after activating the at least one radio component.

17. The method of claim 1, further comprising:
    identifying a scheduling request (SR) reporting configuration based at least in part on the connected mode extended DRX configuration.

18. A method of wireless communication, comprising:
    establishing a radio resource control (RRC) connection with a wireless device;
    configuring the wireless device for connected mode extended discontinuous reception (DRX) comprising a low power period that is longer than a full system frame number (SFN) cycle and an on duration, the connected mode extended DRX configuration also comprising initiation, by the wireless device, of a default DRX inactivity timer and an extended DRX inactivity timer having a period longer than a period of the default DRX inactivity timer, and deactivation of at least one radio component of the wireless device while in the connected mode for the low power period based at least in part on expiration of the extended DRX inactivity timer;
    maintaining the RRC connection with the wireless device during the low power period; and
    communicating with the wireless device after the low power period using the RRC connection during the on duration.

19. The method of claim 18, further comprising:
transmitting an indication of a hyper SFN, wherein the hyper SFN indicates a time period equal to or greater than the full SFN cycle, wherein the indication comprises at least one of a dedicated signal and a broadcast signal.

20. The method of claim 18, further comprising:
transmitting an indication that system information has changed, wherein the indication is associated with a group of user equipment (UEs) configured for extended DRX and the indication comprises at least one of a field in a machine type communication (MTC) specific system information block (SIB) and a field in a system information block 1 (SIB1).

21. The method of claim 18, further comprising:
transmitting an indication that the wireless device is configured for the connected mode extended DRX configuration to a core network element.

22. The method of claim 21, further comprising:
transmitting an exit indication for the connected mode extended DRX configuration to the core network element.

23. The method of claim 21, further comprising:
receiving an exit command for the connected mode extended DRX configuration from the core network element.

24. The method of claim 18, further comprising:
extending a system information block modification period based at least in part on the connected mode extended DRX configuration.

25. The method of claim 18, further comprising:
receiving an extended DRX message comprising an extended DRX capability, an extended DRX preference, or both, wherein the connected mode extended DRX configuration is based at least in part on the extended DRX message.

26. The method of claim 25, further comprising:
notifying a core network element of the extended DRX capability, the extended DRX preference, or both.

27. The method of claim 18, further comprising:
receiving a retransmission request associated with a hybrid automatic repeat request (HARQ) retransmission timer of the wireless device; and
sending a retransmission for the HARQ process based at least in part on the retransmission request.

28. An apparatus for wireless communication, comprising:
a processor;
memory in electronic communication with the processor; and
instructions stored in the memory and operable, when executed by the processor, to cause the apparatus to:
enter a connected mode by establishing a radio resource control (RRC) connection with a base station;
determine a connected mode extended discontinuous reception (DRX) configuration comprising a low power period that is longer than a full system frame number (SFN) cycle;
initiate a default DRX inactivity timer and an extended DRX inactivity timer having a period longer than a period of the default DRX inactivity timer;
deactivate at least one radio component while in the connected mode for the low power period based at least in part on the connected mode extended DRX configuration and on an expiration of the extended DRX inactivity timer; and
activate the at least one radio component after the low power period based at least in part on the connected mode extended DRX configuration.

29. An apparatus for wireless communication, comprising:
a processor;
memory in electronic communication with the processor; and
instructions stored in the memory and operable, when executed by the processor, to cause the apparatus to:
establish a radio resource control (RRC) connection with a wireless device;
configure the wireless device for connected mode extended discontinuous reception (DRX) comprising a low power period that is longer than a full system frame number (SFN) cycle and an on duration, the connected mode extended DRX configuration also comprising initiation, by the wireless device, of a default DRX inactivity timer and an extended DRX inactivity timer having a period longer than a period of the default DRX inactivity timer, and deactivation of at least one radio component of the wireless device while in the connected mode for the low power period based at least in part on expiration of the extended DRX inactivity timer;
maintain the RRC connection with the wireless device during the low power period; and
communicate with the wireless device after the low power period using the RRC connection during the on duration.

* * * * *